United States Patent
Walters et al.

(10) Patent No.: US 7,621,330 B1
(45) Date of Patent: *Nov. 24, 2009

(54) METHODS OF USING A LOWER-QUALITY WATER FOR USE AS SOME OF THE WATER IN THE FORMING AND DELIVERING OF A TREATMENT FLUID INTO A WELLBORE

(75) Inventors: Harold Walters, Duncan, OK (US); Jason Bryant, Duncan, OK (US); Leonard Case, Duncan, OK (US); Jonn Thompson, Flint, TX (US); Michael Segura, Duncan, OK (US); Herbert Hornick, Duncan, OK (US); Von Parkey, Oklahoma City, OK (US); Shaun Burns, Grand Junction, CO (US); Billy Francis Slabaugh, Jr., Wichita Falls, TX (US); Tommy Slabaugh, legal representative, Wichita Falls, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/151,505

(22) Filed: May 7, 2008

(51) Int. Cl.
  *E21B 43/22* (2006.01)
(52) U.S. Cl. .................. 166/279; 166/300; 166/305.1
(58) Field of Classification Search .................. None
  See application file for complete search history.

(56) References Cited

U.S. PATENT DOCUMENTS

| | | | |
|---|---|---|---|
| 4,870,283 A | 9/1989 | Taya | |
| 5,035,807 A | 7/1991 | Maree | |
| 6,488,091 B1 | 12/2002 | Weaver et al. | |
| 6,913,080 B2 | 7/2005 | Lehman et al. | |
| 6,933,262 B1 | 8/2005 | Chesser et al. | |
| 2003/0019627 A1* | 1/2003 | Qu et al. ..................... | 166/281 |
| 2003/0114539 A1 | 6/2003 | Weaver et al. | |
| 2004/0235675 A1* | 11/2004 | Qiu ........................... | 507/200 |
| 2005/0176590 A1 | 8/2005 | Lehman et al. | |
| 2007/0102359 A1 | 5/2007 | Lombardi et al. | |
| 2007/0201305 A1* | 8/2007 | Heilman et al. ............ | 366/141 |
| 2007/0277982 A1 | 12/2007 | Shampine et al. | |

FOREIGN PATENT DOCUMENTS

| | | |
|---|---|---|
| EP | 1 813 577 | 8/2007 |
| WO | WO 93/21112 | 10/1993 |
| WO | WO9321112 | 10/1993 |
| WO | WO 2006/049149 | 5/2006 |
| WO | WO2006096687 | 9/2006 |

* cited by examiner

*Primary Examiner*—Zakiya W. Bates
(74) *Attorney, Agent, or Firm*—Robert A. Kent; Booth Albanesi Schroeder LLC

(57) ABSTRACT

The invention is for a method of forming and delivering a treatment fluid into a wellbore. In one aspect, a method is provided for pumping a first fluid having a relatively high concentration of a particulate suspended therein and pumping a second fluid having either none of the particulate or a relatively low concentration of the particulate suspended therein, and then merging at least the first and second fluids to form a treatment fluid having a merged concentration of the particulate. According to this aspect, the first fluid has a relatively high concentration of a hydratable additive and the second fluid has either none or a relatively low concentration of the hydratable additive.

24 Claims, 4 Drawing Sheets

METHODS OF USING A LOWER-QUALITY WATER FOR USE AS SOME OF THE WATER IN THE FORMING AND DELIVERING OF A TREATMENT FLUID INTO A WELLBORE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

BRIEF SUMMARY OF THE INVENTION

In general, the inventions relate to methods of forming and delivering a treatment fluid into a wellbore. As used herein, "forming" a fluid includes mixing or merging two or more fluids or a fluid with a powdered or particulate material, such as a powdered dissolvable or hydratable additive (prior to hydration) or a proppant. In a continuous treatment or in a continuous part of a well treatment, the fluids are handled as fluid streams.

As used herein, "delivering" into a wellbore includes pumping and directing the treatment fluid into a wellbore. The step of pumping can be on the separate fluid streams used to make up the treatment fluid, on merged streams, or on the completely formed treatment fluid, depending on the method according to the inventions. The step of directing the treatment fluid into a wellbore can be on the separate fluid streams, on a merged fluid stream, or on the completely formed treatment fluid. The merging of separate fluid streams may take place, for example, as the separate fluid streams are directed toward the wellbore, as they enter into the wellbore, or as they move through the wellbore. Directing a fluid stream is typically accomplished with piping or other tubulars. Separate streams of pumped fluid can be merged by using, for example, one or more manifolds.

Using Lower-Quality Water for a Portion of the Treatment Fluid

The first aspect of the inventions generally relates using higher-quality water for one portion of the water for a treatment fluid and lower-quality water for another portion of the water for a treatment fluid, and merging the two portions to form the treatment fluid after pumping the fluid portions toward the wellbore. According this first aspect, a method is provided comprising the steps of continuously: (a) pumping a first fluid comprising a first aqueous solution; (b) pumping a second fluid comprising a second aqueous solution; (c) merging at least the first and second fluids to form a treatment fluid comprising a merged aqueous solution, wherein the merged aqueous solution comprises at least 25% by weight of the first aqueous solution and at least 25% by weight of the second aqueous solution, and wherein the merged aqueous solution has a merged viscosity of less than 100 cP at 40 l/s and at 25° C. (77° F.); and (d) directing the treatment fluid into the wellbore. In general, the second aqueous solution is lower-quality water relative to the first aqueous solution in any material respect relevant to the purpose of forming the treatment fluid or using the treatment fluid. For example, a material respect for the purpose of forming a treatment fluid may be the concentration of a certain dissolved ion, and lower-quality water in such a respect has a higher concentration of such ion.

According to one embodiment of this first aspect of the inventions: (i) the merged aqueous solution has a merged concentration of at least one component selected from the group consisting of: a dissolved ion, oil, grease, a production chemical, and suspended solids; (ii) the first aqueous solution has a concentration of the at least component that is substantially lower than the merged concentration of the at least one component; and (iii) the second aqueous solution has a concentration of the at least one component that is substantially higher than the merged concentration of the at least one component. This allows the use of lower-quality water for some of the water required for making up the treatment fluid. The component is selected for being deleterious to the use or performance of a treatment fluid.

According to another embodiment of this first aspect of the inventions: (i) the merged aqueous solution has a merged concentration of total dissolved solids; (ii) the first aqueous solution has a concentration of total dissolved solids that is substantially lower than the merged concentration of total dissolved solids; and (iii) the second aqueous solution has a concentration of total dissolved solids that is substantially higher than the merged concentration of total dissolved solids.

Treating Lower-Quality Water for Use as a Portion of a Treatment Fluid

A second aspect of the inventions generally relates to treating a base aqueous solution to obtain a first aqueous solution, for example, to have a substantially reduced concentration of at least one component relative to the concentration of the at least one component in the base aqueous solution, and using the first aqueous solution and a lower-quality water, such as the base aqueous solution, to form a treatment fluid. More particularly, the component is selected from the group consisting of: a dissolved ion, oil, grease, a production chemical, and suspended solids. This allows the use of lower-quality water for some of the water required for making up the treatment fluid. The first aqueous solution and the lower-quality water are merged after pumping the fluid portions toward the wellbore. The component is selected for being deleterious to the use or performance of a treatment fluid.

According to one embodiment of this second aspect of the inventions, a method of forming and delivering a treatment fluid into a wellbore is provided, the method comprising the steps of: (a) treating a base aqueous solution to obtain the first aqueous solution having a substantially reduced concentration of at least one component relative to the concentration of the at least one component in the base aqueous solution, wherein the component is selected from the group consisting of: a dissolved ion, oil, grease, a production chemical, and suspended solids; (b) pumping a first fluid comprising the first aqueous solution; (c) pumping a second fluid comprising a second aqueous solution; (d) merging at least the first and second fluids to form a treatment fluid comprising a merged aqueous solution, wherein the merged aqueous solution comprises at least 25% by weight of the first aqueous solution and at least 25% by weight of the second aqueous solution, and wherein the merged aqueous solution has a merged viscosity of less than 100 cP at 40 l/s and at 25° C. (77° F.); and (e) directing the treatment fluid into the wellbore. More particularly, (i) the merged aqueous solution has a merged concentration of the at least one component; (ii) the first aqueous solution has a concentration of the at least one component that is substantially lower than the merged concentration of the at least one component; and (iii) the second aqueous solution has a concentration of the at least one component that is substantially higher than the merged concentration of the at least one component.

According to another embodiment of this second aspect of the inventions, a method of forming and delivering a treatment fluid into a wellbore is provided, the method comprising the steps of: (a) treating a base aqueous solution to obtain the first aqueous solution having a substantially reduced concentration of total dissolved solids relative to the concentration of the total dissolved solids in the base aqueous solution; (b) pumping a first fluid comprising the first aqueous solution; (c) pumping a second fluid comprising a second aqueous solution; (d) merging at least the first and second fluids to form a treatment fluid having a merged aqueous solution, wherein the merged aqueous solution comprises at least 25% by weight of the first aqueous solution and at least 25% by weight of the second aqueous solution, and wherein the merged aqueous solution has a merged viscosity of less than 100 cP at 40 l/s and at 25° C. (77° F.); and (e) directing the treatment fluid into a wellbore. More particularly, (i) the merged aqueous solution has a merged concentration of total dissolved solids; (ii) the first aqueous solution has a concentration of total dissolved solids that is substantially lower than the merged concentration of total dissolved solids; and (iii) the second aqueous solution has a concentration of total dissolved solids that is substantially higher than the merged concentration of total dissolved solids.

Prehydrating an Unhydrated Hydratable Additive

The third aspect of the inventions generally relates to prehydrating an unhydrated hydratable additive in water having a lower concentration of at least one ion that can interfere with the hydration or cross-linking of the hydratable additive and then mixing the prehydrated additive with water having a higher concentration of such ion. According to this third aspect, the method comprises the steps of: (a) forming a premix fluid comprising: (i) an unhydrated hydratable additive; and (ii) a first aqueous solution; (b) subsequently forming a treatment fluid comprising: (i) the premix fluid; and (ii) a second aqueous solution; and (c) simultaneously with or subsequently to the step of forming the treatment fluid, delivering the treatment fluid into the wellbore. As used herein, it should be understood that a lower concentration of any material, such as a certain type of dissolved ion, may mean and include a zero concentration of such material.

According to one embodiment of this third aspect of the inventions: (i) the first aqueous solution has a concentration of at least one ion that is substantially lower than the concentration of the at least one ion in the second aqueous solution; and (ii) the treatment fluid has a merged viscosity of less than 100 cP at 40 l/s and at 25° C. (77° F.).

According to another embodiment of this third aspect of the inventions: (i) the first aqueous solution has combined dissolved calcium and magnesium ions of less than 10,000 ppm; and (ii) the second aqueous solution has combined dissolved calcium and magnesium ions of greater than 15,000 ppm; and (iii) the treatment fluid has a merged viscosity of less than 100 cP at 40 l/s and at 25° C. (77° F.).

According to yet another embodiment of this third aspect, (i) the first aqueous solution has total dissolved solids of less than 30,000 ppm; and (ii) the second aqueous solution has total dissolved solids of greater than 40,000 ppm; and (iii) the treatment fluid has a merged viscosity of less than 100 cP at 40 l/s and at 25° C. (77° F.).

Pumping Different Particulate Concentrations at Different Average Bulk Fluid Velocities The fourth aspect of the inventions generally relates to pumping a first fluid having a relatively high concentration of a particulate suspended therein and pumping a second fluid having either none of the particulate or a relatively low concentration of the particulate suspended therein, and then merging at least the first and second fluids to form a treatment fluid having a merged concentration of the particulate. According to this aspect, the first and second fluids are pumped at different average bulk fluid velocities. In this context, "particulate" means and refers to a solid, water-insoluble material having consistently defined characteristics, such as material and mesh size. An example of a particulate includes, for example, 20-40 mesh sand for use as proppant.

According to this fourth aspect, the method comprises the steps of: (a) pumping a first fluid comprising a first aqueous solution with a first positive-displacement pump; (b) pumping a second fluid comprising a second aqueous solution with a second positive-displacement pump; (c) merging at least the first and second fluids to form a treatment fluid; and (d) directing the treatment fluid into a wellbore. For this aspect of the inventions: (i) the treatment fluid comprises a merged concentration of the particulate; (ii) the first fluid comprises a first concentration of the particulate that is substantially higher than the merged concentration of the particulate; (iii) the second fluid comprises a second concentration of the particulate that is substantially lower than the merged concentration of the particulate; and (iv) the first fluid is pumped at a substantially lower average bulk fluid velocity than the average bulk fluid velocity at which the second fluid is pumped. As used herein, it should be understood that a relatively low concentration of any material, such as a proppant, may mean and include a zero concentration of such material.

According to this aspect of the inventions, preferably the first fluid and the second fluid each comprise at least 10% by weight of the treatment fluid. More preferably according to this aspect, the first fluid and the second fluid each comprise at least 25% by weight of the treatment fluid.

Pumping Fluids with Different Concentrations of Particulate and Hydratable Additive The fifth aspect of the inventions generally relates to pumping a first fluid having a relatively high concentration of a particulate suspended therein and pumping a second fluid having either none of the particulate or a relatively low concentration of the particulate suspended therein, and then merging at least the first and second fluids to form a treatment fluid having a merged concentration of the particulate. According to this aspect, the first fluid also has a relatively high concentration of a hydratable additive and the second fluid has either none or a relatively low concentration of the additive. In this context, the particulate means and refers to a solid, insoluble material having consistently defined characteristics, such as mesh size. An example of a particulate includes, for example, 20-40 mesh sand for use as proppant. The hydratable additive is preferably selected from the group consisting of a water-soluble viscosity-increasing agent, a water-soluble a friction-reducing agent, or a water-soluble elasticity-increasing agent.

According to this fifth aspect, the method comprises the steps of: (a) pumping a first fluid comprising a first aqueous solution with a first positive-displacement pump; (b) pumping a second fluid comprising a second aqueous solution with a second positive-displacement pump; (c) merging at least the first and second fluids to form a treatment fluid; and (d) directing the treatment fluid into a wellbore. For this aspect of the inventions: (i) the treatment fluid comprises a merged concentration of a particulate and a merged concentration of a hydratable additive, where the additive is a water-soluble viscosity-increasing agent, a water-soluble friction-reducing agent, or a water-soluble elasticity-increasing agent; (ii) the first fluid comprises a first concentration of the particulate that is substantially higher than the merged concentration of the particulate and a first concentration of the additive that is substantially higher than the merged concentration of the additive; and (iii) the second fluid comprises a second concentration of the particulate that is substantially lower than the merged concentration of the particulate and a second concentration of the additive that is substantially lower than the merged concentration of the additive.

As used herein, the words "comprise," "has," and "include" and all grammatical variations thereof are each intended to have an open, non-limiting meaning that does not exclude additional steps, elements, ingredients, or materials. Further, as used herein, the term "substantially" in regard to a relative difference means a difference of at least 25%. For example, if a first concentration of a particular ion or of proppant is substantially lower than a second concentration, it means that the first concentration is at least 25% lower than the second concentration, down to and including a first concentration of zero. If the difference is not expressly stated with respect to another concentration, then the difference is based on the larger of the two measurements.

As used herein, "base," "first," "second," "premix," and "merged" may be arbitrarily assigned and are merely intended to differentiate between two or more fluids, aqueous solutions, concentrations, viscosities, pumps, etc., as the case may be. Furthermore, it is to be understood that the mere use of the term "first" does not require that there be any "second," and the mere use of the word "second" does not require that there by any "third," etc.

Preferably, two or more aspects of the invention or preferred embodiments are used together or in subcombination to obtain combined methods and synergistic benefits, advantages, and costs savings.

These and further aspects and embodiments of the inventions and various advantages of the aspects and embodiments of the inventions are in the detailed description.

BRIEF DESCRIPTION OF THE DRAWING

A more complete understanding of the present inventions and the advantages thereof may be acquired by referring to the following description taken in conjunction with the accompanying drawings in which.

DETAILED DESCRIPTION OF THE INVENTIONS

Figure 1:
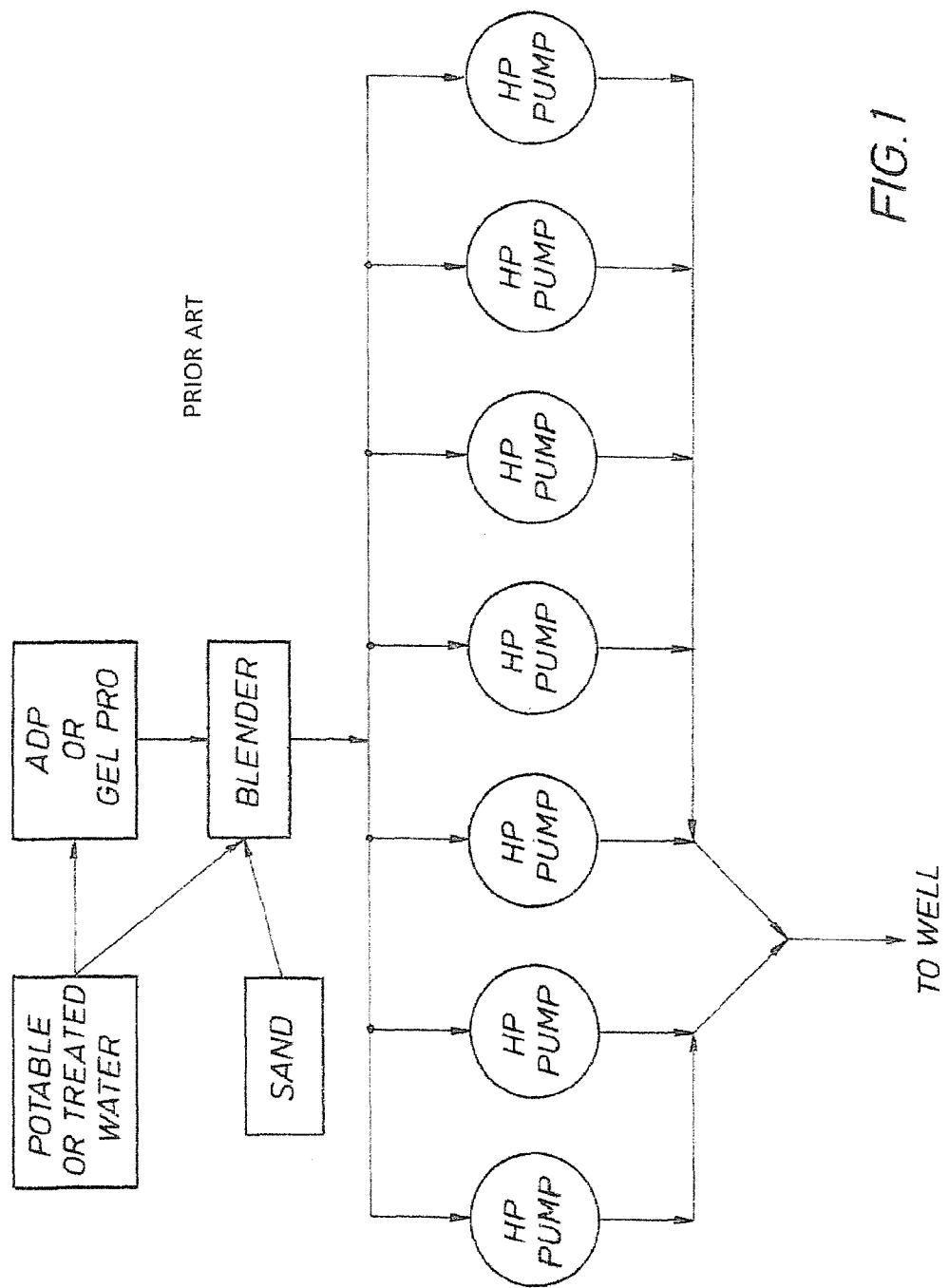
FIG. 1 is a flow diagram of a conventional equipment spread used in hydraulic fracturing of a portion of a reservoir adjacent a wellbore penetrating the reservoir. A typical fracturing uses water that is entirely made up of potable water, freshwater, and/or treated water. The water is mixed with a viscosity-increasing agent in an "ADP" or "GEL PRO" mixer or mixing step to provide a higher viscosity fluid to help suspend sand or other particulate. The water and/or the higher-viscosity water-based fluid are then mixed with sand in a blender to form a treatment fluid for fracturing. An array of high-pressure ("HP") pumps that are arranged in parallel is used to deliver the treatment fluid into the wellbore of a well.

Oil and gas hydrocarbons are naturally occurring in some subterranean formations, which are called reservoirs. As used herein, a well includes at least one wellbore drilled into the earth to try and reach an oil or gas reservoir and produce oil or gas from the reservoir.

As used herein, the term "wellbore" refers to the wellbore itself, including the openhole or uncased portion of the well. Further, as used herein, "into the wellbore" means and includes directly into and through the wellbore or into and through a casing, liner, or other tubular within the wellbore. The near-wellbore region is the subterranean material and rock of the subterranean formation surrounding the wellbore.

It is often desirable to treat a wellbore or a portion of a subterranean formation with various types of treatment fluids in the efforts to produce oil or gas from a reservoir. A treatment is designed to resolve a specific wellbore or reservoir condition. For example, stimulation is a treatment performed on a well to restore or enhance the productivity of the well. Stimulation treatments fall into two main groups, hydraulic fracturing and matrix treatments. Fracturing treatments are performed above the fracture pressure of the reservoir formation and create a highly conductive flow path between the reservoir and the wellbore. Hydraulic fracturing will hereinafter be described in more detail. Matrix treatments are performed below the reservoir fracture pressure and generally are designed to restore the natural permeability of the reservoir following damage to the near-wellbore region.

As used herein, a "treatment fluid" is a fluid designed and prepared to resolve a specific wellbore or reservoir condition. The treatment fluid may be for any of a wide variety of downhole purposes in a well, such as stimulation, isolation, or control of reservoir gas or water. "Stimulation" is a treatment for the purpose of enhancing or stimulating oil or gas production. "Isolation" is a treatment for the purpose of isolating one region or portion of a wellbore or subterranean formation from another. "Control" is a treatment for the purpose of controlling or limiting excess water production or sand production from the well. Treatment fluids are typically prepared adjacent to the wellhead at the well site. The term "treatment" in the term "treatment fluid" does not necessarily imply any particular action by the fluid. As used herein, a fluid may or may not be a slurry, which is a suspension of insoluble particles (such as sand, clay, etc.) in a fluid. The treatment fluids are often, but not necessarily, water based. It should be understood from the context of these inventions, of course, that as used herein a "fluid" is a continuous amorphous substance that tends to flow and to conform to the outline of its container as a liquid or a gas, when tested at a temperature at room temperature of 68° F. (20° C.) and standard pressure (1 atm).

As used herein, "water-based" means that the fluid comprises greater than 50% by weight of an aqueous solution. In general, as used herein, an "aqueous solution" refers to a water used or received to be used in any of the methods according to the invention. The water is referred to as an "aqueous solution" because it would be expected to normally include substantial or insubstantial concentrations of dissolved solids, such as sodium chloride, calcium chloride, magnesium chloride, sodium sulfate, and other water-soluble salts (up to the saturation limit of each). The term "aqueous solution" may include small amounts of other materials, however, the term excludes anything that is included in or added to the aqueous solution for the purposes of a well treatment in which the aqueous solution is to be used. For example and preferably, an "aqueous solution" may be up to 1% by weight of total water-miscible or water-soluble organic materials; up to 2% by weight of total dispersed, oil, grease, and water-insoluble production chemicals; up to 10% by weight of total dispersed oil, grease, and non-surfactant water-insoluble production chemicals with surfactant production chemicals; and up to 1% by weight of total suspended silt or smaller particles (avoiding any layer of oil or other insoluble materials floating on the surface or any sludge settled on the bottom of the water as received). For example, the oil, grease, and production chemicals would be typically found, for example, in produced water. A water-based fluid (comprising an aqueous solution) may or may not include other suspended components, such as oil, clay, proppant, and other additives, which can be added to or mixed with the aqueous solution for the purposes of forming a treatment fluid for a well treatment. A water-based fluid can be an emulsion, foamed with a gas, or both. For example, such suspended components can be selected from the group consisting of: a clay, a water-insoluble organic material, a gas, and any combination thereof in any proportion. Further, a water-based fluid may include other water-soluble or water-miscible additives.

An example of a water-based treatment fluid is a fracturing fluid. Another example of a water-based treatment fluid is a drilling mud, which includes an aqueous solution and undissolved solids (as solid suspensions, mixtures, and emulsions). A water-based drilling mud can be based on a brine. Both the dissolved solids and the undissolved solids can be chosen to help increase the density of the fluid. A commonly-used example of an undissolved weighting agent is bentonite clay. The density of a drilling mud can be much higher than that of typical seawater or even higher than high-density brines due to the presence of suspended solids.

As will hereinafter be explained in more detail, the methods of the present inventions are most particularly directed to and preferably used in the formation and delivery of a treatment fluid that is used in a high volume in a well treatment, i.e., greater than 1,000 barrels (42,000 U.S. gallons). Further, it is to be understood that a treatment fluid is preferably to be formed and delivered continuously or "on the fly" into a wellbore. In addition, it should be understood that a treatment fluid is formed to have substantially the same composition in all material respects, such as concentrations of the amount of hydratable polymer and other components used, although the amount of proppant concentration may be varied, for example, in the case of a treatment fluid having a ramped up concentration of proppant or having a higher "tail-end" concentration of a particulate (such as a proppant). In a well treatment where the concentration of particulate varies in the course of delivering a treatment fluid into a wellbore for a particular treatment, as in the case of a higher tail-end concentration of proppant in a water-frac, the concentration of particulate in the treatment fluid or in a fluid used to make up the treatment fluid is the average concentration over the course of delivering the treatment fluid into the wellbore. Except for variations in the concentration of the particulate, substantial variations in the concentrations of the various materials or components of specified herein to be required in a treatment fluid would be defined as a separate or different treatment fluid. Of course, variations in composition that do not otherwise materially impact the usefulness or the performance of the treatment fluid are permissible.

Hydraulic Fracturing and Proppant

"Hydraulic fracturing," sometimes simply referred to as "fracturing," is a common stimulation treatment. A treatment fluid for this purpose is sometimes referred to as a "fracturing fluid." The fracturing fluid is pumped at a high flow rate and high pressure down into the wellbore and out into the formation. The pumping of the fracturing fluid is at a high flow rate and pressure that is much faster and higher than the fluid can escape through the permeability of the formation. Thus, the high flow rate and pressure creates or enhances a fracture in the subterranean formation. Creating a fracture means making a new fracture in the formation. Enhancing a fracture means enlarging a pre-existing fracture in the formation.

For pumping in hydraulic fracturing, a "frac pump" is used, which is a high-pressure, high-volume pump. Typically, a frac pump is a positive-displacement reciprocating pump. These pumps generally are capable of pumping a wide range of fluid types, including corrosive fluids, abrasive fluids and slurries containing relatively large particulates, such as sand. Using a frac pump, the fracturing fluid may be pumped down into the wellbore at high rates and pressures, for example, at a flow rate in excess of 100 barrels per minute (3,100 U.S. gallons per minute) at a pressure in excess of 5,000 pounds per square inch ("psi"). The pump rate and pressure of the fracturing fluid may be even higher, for example, pressures in excess of 10,000 psi are not uncommon.

To fracture a subterranean formation typically requires hundreds of thousands of gallons of fracturing fluid. Further, it is often desirable to fracture at more than one downhole location. For various reasons, including the high volumes of fracturing fluid required, ready availability, and historically low cost, the fracturing fluid is usually water or water-based. Thus, fracturing a well may require millions of gallons of water.

When the formation fractures or an existing fracture is enhanced, the fracturing fluid suddenly has a fluid flow path through the crack to flow more rapidly away from the wellbore. As soon as the fracture is created or enhanced, the sudden increase in flow of fluid away from the well reduces the pressure in the well. Thus, the creation or enhancement of a fracture in the formation is indicated by a sudden drop in fluid pressure, which can be observed at the well head.

After it is created, the newly-created fracture will tend to close after the pumping of the fracturing fluid is stopped. To prevent the fracture from closing, a material must be placed in the fracture to keep the fracture propped open. This material is usually in the form of an insoluble particulate, which can be suspended in the fracturing fluid, carried downhole, and deposited in the fracture. The particulate material holds the fracture open while still allowing fluid flow through the permeability of the particulate. A particulate material used for this purpose is often referred to as a "proppant." When deposited in the fracture, the proppant forms a "proppant pack," and, while holding the fracture apart, provides forming conductive channels through which fluids may flow to the wellbore. For this purpose, the particulate is selected typically selected based on two characteristics: size range and strength.

The particulate must have an appropriate size to prop open the fracture and allow fluid to flow through the particulate pack, i.e., in between and around the particles making up the pack. Appropriate sizes of particulate for use as a proppant are typically in the range from about 8 to about 100 U.S. Standard Mesh. A typical proppant is sand, which geologically is defined as having a particle size ranging in diameter from about 0.0625 millimeters (1/16 mm) up to about 2 millimeters. (The next smaller size class in geology is silt: particles smaller than 0.0625 mm down to 0.004 mm in diameter. The next larger size class above sand is gravel, with particles ranging from greater than 2 mm up to 64 mm.)

The particulate material must be sufficiently strong, e.g., have a sufficient compressive strength or crush resistance, to prop the fracture open without being completely crushed by the subterranean forces that would otherwise close the fracture.

As used herein, "particulate" means and refers to a particulate material that is suitable for use as a proppant pack or gravel pack, including without limitation sand or gravel, synthetic materials, manufactured materials, and any combinations thereof. For this purpose, "particulate" does not mean or refer to suspended solids, silt, fines, or other types of particulate smaller than 0.0625 mm. Further, it does not mean or refer to particulate larger than 64 mm. Of course, "particulate" also does not mean or refer to dissolved solids. The fracture, especially if propped open by a proppant pack, provides an additional flow path for the oil or gas to reach the wellbore, which increases oil and gas production from the well.

Viscosity-Increasing Agents to Help Suspend Proppant

The proppant material typically has a much higher density than water. For example, sand has a specific gravity of about 2. Any proppant suspended in the water will tend to separate quickly and settle out from the water very rapidly. To help suspend the proppant (or other particulate with a substantially different density than water) in a water-based fracturing fluid, it is common to use a viscosity-increasing agent for the purpose of increasing the viscosity of water.

Viscosity is the resistance of a fluid or slurry to flow, defined as the ratio of shear stress to shear rate. The unit of viscosity is Poise, equivalent to dyne-sec/cm$^2$. Because one poise represents a relatively high viscosity, 1/100 poise, or one centipoise ("cP"), is usually used with regard to well treatment fluids. Viscosity must have a stated or an understood shear rate in order to be meaningful. Measurement temperature also must be stated or understood. As used herein, if not otherwise specifically stated, the viscosity is measured with a Model 50 type viscometer at a shear rate of 40 l/s and at 25° C. (77° F.). It should be understood, of course, that the viscosity of any fluid (e.g., a component fluid to be used in forming a treatment fluid), would be determined at 40 l/s and 25° C. (77° F.). As used herein, if not otherwise specifically stated, the viscosity of a treatment fluid is measured at any point in the treatment job, i.e., at any time between directing of the treatment fluid into the wellbore and for so long as the pumping equipment for the treatment fluid is on the well site for the treatment job. Of course, the viscosity of a treatment fluid under downhole conditions may be inferred. Further, it should be understood that the viscosity of any fluid would be determined without particulate, i.e., without proppant type particulate.

The viscosity of water is about 1 cP. A viscosity-increasing agent is a chemical additive that alters fluid rheological properties to increase the viscosity of the fluid. A viscosity-increasing agent can be used to increase the viscosity, which increased viscosity can be used, for example, to help suspend a proppant material in the treatment fluid. According to certain aspects of the present inventions, the methods are particularly advantageously used for treatment fluids having a viscosity of less than 100 cP at 40 l/s and 25° C. (77° F.) throughout the treatment job. Treatment fluids having such low viscosity are used in some water-frac treatments. Treatment fluids having such low viscosity are often referred to as "base gels," which excludes, for example, fluids that are typically referred to as "cross-linked gels" and "surfactant gels."

Because of the high volume of fracturing fluid used in fracturing, it is desirable to increase the viscosity of fracturing fluids efficiently in proportion to the concentration of the viscosity-increasing agent. Being able to use only a small concentration of the viscosity-increasing agent requires less total amount to achieve the desired fluid viscosity in a large volume of fracturing fluid. Efficient and inexpensive viscosity-increasing agents include water-soluble polymers such as guar gum. Other types of viscosity-increasing agents may also be used for various reasons, for example, in high-temperature applications.

The viscosity of solutions with viscosity-increasing agents can be greatly enhanced by crosslinking the viscosity-increasing agent with a cross-linking agent. For example, guar gum and similar viscosity-increasing agents can be crosslinked with boric acid or other boron containing materials. Thus, boron crosslinked guar gum solutions are commonly used as fracturing fluids. Of course, there are numerous other types of cross-linking agents. As discussed herein, however, crosslinking is undesirable for certain types of well treatments, such as a water-frac treatments. Further, the presence of a substantial concentration of boron in the water, either naturally occurring or in produced water may cause undesirable cross-linking.

Friction-Reducing Agents to Help Pumpability of a Fluid

In some instances a fracturing treatment involves pumping a proppant-free fracturing fluid into a subterranean formation. During the pumping of the fracturing fluid into the wellbore, a considerable amount of energy may be lost due to friction between the treatment fluid in turbulent flow and the formation and/or tubular goods (e.g., pipes, coiled tubing, etc.) disposed within the wellbore. As a result of these energy losses, additional horsepower may be necessary to achieve the desired treatment.

To reduce these energy losses, a friction-reducing agent (sometimes called a friction reducer) may be included in the treatment fluid. A friction-reducing agent is a chemical additive that alters fluid rheological properties to reduce friction created within the fluid as it flows through small-diameter tubulars or similar restrictions. Generally, polymers or similar friction-reducing agents add viscosity to the fluid, which reduces the turbulence induced as the fluid flows. The friction-reducing agent reduces the frictional losses due to friction between the treatment fluid in turbulent flow and the tubular goods and/or the formation: Friction-reducing agents add some viscosity to the fluid, which reduces the turbulence induced as the fluid flows. For friction-reducing purposes, the viscosity of a treatment fluid may be increased only slightly, for example, from about 1 cP to a viscosity of less than 35 cP. According to certain aspects of the present inventions, the methods are particularly advantageously used for treatment fluids having a viscosity of less than 35 cP at 40 l/s and 25° C. (77° F.) throughout the treatment job. Treatment fluids having such very low viscosity are often used in water-frac treatments. Treatment fluids having such very low viscosity are often referred to as "friction-reducing fluids," excludes, for example, "base gel fluids," "cross-linked gels," and "surfactant gels."

A friction reducer can also help reduce the apparent viscosity and improve the rheological properties of a slurry, e.g., a water-based fluid containing a proppant. As a result, turbulent flow can be achieved at lower pumping rates, which results in reduced friction pressure during pumping. When the apparent viscosity of a slurry is reduced, the slurry can be mixed at a higher density by reductions in the amount of mix water added. Although the slurry is denser, it remains easy to pump.

Like viscosity-increasing agents, friction-reducing agents are often comprised of hydratable polymers. Similarly, the friction-reducing agents are typically hydrated directly in the water to be used in the well treatment fluid. In some cases, a viscosity-increasing agent and a friction-reducing agent may be the same hydratable polymer, merely used in a lower concentration for the purpose of reducing fluid friction.

Although any friction-reducing agent may be used in the methods according to the inventions, examples of water-soluble friction-reducing agents include guar gum, guar gum derivatives, polyacrylamide, and polyethylene oxide.

Elasticity-Increasing Agents to Help Pumpability of a Fluid

Elasticity pertains to a material that can undergo stress, deform, and then recover and return to its original shape after the stress ceases. Once stress exceeds the yield stress or elastic limit of a material, permanent deformation occurs and the material will not return to its original shape once the stress is removed. Elastic behavior can depend on the temperature and the duration of the stress as well as the intensity of the stress.

Elasticity of a fluid is a material property characterizing the compressibility of the fluid—how easy a unit of the fluid volume can be changed when changing the pressure working upon it. An increase in the pressure will decrease the volume of the fluid. A decrease in the volume will increase the density of the fluid.

It is sometimes desirable to include a water-soluble elasticity-increasing agent in a fracturing fluid. Again, like viscosity-increasing agents, some elasticity-increasing agents are sensitive to certain ions that may be present in a type or source of water that would otherwise be most convenient to use in a treatment fluid.

Water Fracturing

A "water frac" is a type of hydraulic fracturing in which the present inventions are expected to have particular advantage and benefit. A water frac is characteristically employed for low permeability reservoirs that typically require extended-length fractures to maximize the surface area of the fracture faces and therefore improve production volumes and rates. A water frac is believed to be a lower cost alternative to pumping large volumes of proppant suspended in a viscous gelled fluid. A typical modern water frac involves pumping very large volumes of fresh water (e.g., 10,000 bbl or more), with relatively low concentrations of additives, e.g., friction reducer, surfactant, and clay stabilizer, and with relatively low particulate (e.g., sand) concentrations (e.g., 0.5 ppg during bulk with tail-in from 0.5 to 2 ppg during last 1-5% of job). Higher sand concentrations of proppant near the end of the treatment help prop the fracture near the wellbore. Since the treating fluid is primarily water (not gel), clean-up problems sometimes experienced with conventional treatments are minimized. The low viscosity of the water treating fluid (e.g., less than 100 cP at 40 l/s and at 25° C. (77° F.)) tends to maximize fracture length while minimizing fracture height.

Problem with Certain Hydratable Additives and Certain Dissolved Ions in Water

Most, if not all, of the commonly used water-soluble viscosity-increasing agents, water-soluble friction-reducing agents, and water-soluble elasticity-increasing agents are comprised of a hydratable material. As used herein, a "hydratable additive" is selected from the group consisting of: a water-soluble viscosity-increasing agent, a water-soluble friction-reducing agent, and a water-soluble elasticity-increasing agent.

As used herein, the term "water soluble" means at least 1% by weight soluble in distilled water when tested at room temperature of 68° F. (20° C.) and standard pressure (1 atm).

As referred to herein, "hydratable" means capable of being hydrated by contacting the hydratable additive with water. Regarding a hydratable additive that comprises a polymer, this means, among other things, to associate sites on the polymer with water molecules and to unravel and extend the polymer chain in the water. Viscosity-increasing agents have been conventionally hydrated directly in the water at the concentration to be used for the well treatment fluid.

A common problem with using hydratable additives is that many of the commonly-used hydratable additives used for such purposes are sensitive to dissolved ions in the water. The hydratable additives are often especially sensitive to divalent cations such as calcium and magnesium. For example, divalent cations such as calcium and magnesium may inhibit and slow the time required for hydration of certain types of polymers commonly used for such purposes.

Water that tends to be more difficult to use with hydratable additives is water having a concentration of dissolved alkaline earth metal ions of more than 1,000 ppm. For example, some hydratable polymers are difficult to hydrate in water that contains more total dissolved solids than seawater, and sometimes the specific type of hydratable polymer desired to be used is sensitive to even lower concentrations of total dissolved solids. For example, xanthan gum, which is sometimes used as a viscosity-increasing agent, can be slow and difficult to hydrate thoroughly in such aqueous solutions. Full hydration of the xanthan polymer is important because incomplete hydration will impair development of viscosity in the fluid and may also cause fine particulate matter of incompletely hydrated xanthan gum to damage the permeability of the formation. Hydration of xanthan in freshwater is not usually problematic.

Furthermore, the hydratable polymer may be sensitive to other ions, including borate ions, which in some cases and under certain conditions can undesirably crosslink the polymer.

Therefore, in the past fracturing fluids often have required the use of water that does not contain high concentrations of total dissolved solids, especially high concentrations of dissolved divalent cations. For this reason, most fracturing fluids require a minimum quality of water. Most fracturing fluids are run in potable or freshwater. However, potable water and freshwater is becoming increasingly expensive and difficult to come by, especially considering the high volumes of water required for fracturing.

To solve the problem of hydration in water having high concentrations of TDS, especially due to high concentration of divalent cations, another conventional approach has included chemically modifying the hydratable polymer so that it is better capable of hydrating in water having high TDS. Other approaches to handling water having high concentrations of TDS were by chemical addition to reduce the effect of salt. Another conventional approach has included heating a brine to about 140° F. (60° C.) to increase the hydration rate of the hydratable polymer in the brine. However, heating of brine is time consuming, expensive, and difficult to achieve in the field. Further, heating of a brine may cause the viscosity-increasing agent to build excessive viscosity if later subjected to high wellbore temperatures. It can be prohibitively expensive to heat large quantities of water.

Yet another attempted solution has been to treat the water to remove some of the interfering ions. There are several existing methods of treating non-freshwater such as evaporative distillation and reverse osmosis. Both of these treatment methods remove the vast majority of TDS from the water. The most common method of treating water for use in a fracturing treatment is evaporative distillation, however, this method is very expensive and often impractical on the scale needed. Removing excess ions by reverse osmosis is also an expensive process. Of course, the costs of treating water are multiplied by the large volumes of water required for well treatments, especially for the volumes of water required for water-fracturing treatments.

Problem with Pumping Proppant-Containing Treatment Fluids

A problem with pumping a treatment fluid with a particulate, for example, a fracturing fluid containing a proppant, is that the sand or other type of particulate material is usually very abrasive when pumped in a fluid moving at high pumping rates. This leads to wear on the pumping equipment during use. The abrasiveness of the proppant can cause erosion on metal surfaces inside pumps, connective piping, and downhole tubulars and equipment. The erosion is especially problematic within the pumps, where the local fluid velocities adjacent to valves and other surfaces can be much higher than the average velocity of the fluid being pumped through a cylinder of the fluid end. The erosion of these surfaces causes wear on the pumps and can result in high maintenance costs.

Water Classifications

There are various methods of describing water quality, for example, ion types in water, their ionic strength, and total dissolved solids. Water may also be classified based on its source.

Solids are found in water in two basic forms, suspended and dissolved. Suspended solids include silt, stirred-up bottom sediment, decaying plant matter, or sewage-treatment effluent. Suspended solids will not pass through a filter, whereas dissolved solids will.

Total dissolved solids ("TDS") refers to the sum of all minerals, metals, cations, and anions dissolved in water. As most of the dissolved solids are typically salts, the amount of salt in water is often described by the concentration of total dissolved solids in the water.

Dissolved solids in typical freshwater samples include soluble salts that yield ions such as sodium ($Na^+$), calcium ($Ca^{2+}$), magnesium ($Mg^{2+}$), bicarbonate ($HCO_3^-$), sulfate ($SO_4^{2-}$), or chloride ($Cl^-$). Water that contains significant amounts of dissolved salts is sometimes broadly called saline water or brine, and is expressed as the amount (by weight) of TDS in water in mg/l. On average, seawater in the world's oceans has a salinity of about 3.5%, or 35 parts per thousand. More than 70 elements are dissolved in seawater, but only six elements make up greater than 99% by weight.

Total dissolved solids can be determined by evaporating a pre-filtered sample to dryness, and then finding the mass of the dry residue per liter of sample. A second method uses a Vernier Conductivity Probe to determine the ability of the dissolved salts in an unfiltered sample to conduct an electrical current. The conductivity is then converted to TDS. Either of these methods yields a TDS value, typically reported in units of mg/L.

Hardness is a more specific measure of the dissolved calcium ($Ca^{+2}$), magnesium ($Mg^{+2}$) and ferrous ($Fe^{+2}$, a form of iron) ions in water. Hardness can be quantitatively determined by titration using standardized EDTA reagent and ammonium hydroxide buffer, typically according to procedures of the API. The hardness ion $Ca^{+2}$ can be analyzed alone by another EDTA titration method described by the API. Hardness ions develop from dissolved minerals, bicarbonate, carbonate, sulfate, and chloride.

Broadly speaking, either "saline water" or "brine" is often understood to be water containing any substantial concentration of dissolved inorganic salts, regardless of the particular concentration. Thus, "saline water" or "brine" may broadly refer to water containing anywhere from about 1,000 ppm to high percentages of dissolved salts. In fact, brines used for oil field purposes sometimes contain total dissolved solids of up to about 10% or higher.

More technically, however, the terms "saline water," "brine," and other terms regarding water may sometimes be used to refer to more precise ranges of concentrations of TDS. Although the specific ranges of TDS for various types of water are not universally agreed upon, various sources have used the definitions and ranges shown in Table 1. As used herein, unless the context otherwise suggests, the terms for classifying water based on concentration of TDS will generally be understood as defined in Table 1.

TABLE 1

A Classification of Water Based on TDS Concentration and Relationship to Density

| | TDS Concentration Ranges | | Density @ 20° C. | |
|---|---|---|---|---|
| Water | Ppm | Lb/gal (US) | g/ml | lb/gal (US) |
| Potable | <250 | <0.0021 | | |
| Freshwater | <1,000 | <0.0083 | <0.998 | <8.33 |
| Brackish | 1,000-15,000 | 0.0083-0.0417 | | |

TABLE 1-continued

A Classification of Water Based on TDS Concentration and Relationship to Density

| Water | TDS Concentration Ranges | | Density @ 20° C. | |
|---|---|---|---|---|
| | Ppm | Lb/gal (US) | g/ml | lb/gal (US) |
| Saline | 15,000-30,000 | 0.0417-0.1251 | | |
| Seawater | 30,000-40,000 | 0.1251-0.3338 | 1.020-1.029 | 8.51-8.59 |
| Brine | >40,000 | >0.3338 | | |

Potable water is water that is suitable for drinking. In addition to having low TDS, usually required by municipalities to be less than 250 ppm and preferably less than 100 ppm, potable water must otherwise be suitable for drinking, for example, not having poisons or pathogens. Potable water is usually considered to be freshwater, but not all freshwater is considered to be potable water. While potable water is rarely required for fracturing fluids or other types of treatment fluids, it may be used if conveniently and economically available, for example, for purchase from a local water district or municipality. Nevertheless, potable water is usually the most expensive type of water, and its use for well operations or treatments is most likely to become increasingly restricted.

Water may also be classified based on its source. Classifying water based on its source is a classification that is independent of the classification based on a particular parameter, such as TDS. Sources of water are listed in Table 2.

TABLE 2

A Classification of Water Based on Source

| Water | Source | TDS concentration |
|---|---|---|
| surface water | water on land, e.g., streams, lakes. | Usually freshwater levels |
| ground water | the ground, e.g., from a freshwater well | Usually freshwater levels |
| Seawater | Ocean or sea | Seawater levels |
| connate water or fossil water | water trapped in the pores of the rock during formation of the rock | Any, but usually at least brackish levels |
| formation water or interstitial water | water found in the pore spaces of a rock, and might not have been present when the rock was formed | Any, but usually at least brackish levels |
| returned water | returned water from a treatment fluid introduced into an oil or gas well | Any, but usually at least brackish levels |
| produced water | produced from a oil or gas well that is not a treatment fluid | Any, but usually at least brackish levels |

Due to a number of factors, the range of TDS concentrations in naturally-occurring surface water, such as freshwater, brackish water, saline water, and seawater, can vary considerably within the defined ranges for the type of water. Water that is not naturally occurring can be similarly classified by the concentration of TDS, of course, which is generally with reference to the concentrations of TDS in the various types of naturally-occurring water.

Non-potable water that may be suitable for treatment fluids that include a hydratable polymer sensitive to certain dissolved ions includes freshwater, brackish water, saline water, and seawater. Of course, if locally available, brackish water or seawater is relatively cheap. However, some of the polymers used in treatment fluids are sensitive to the levels of TDS or specific ions at concentrations higher than found in freshwater.

The typical composition of seawater is shown in Table 3.

TABLE 3

Typical Composition of Seawater

| Dissolved Ion | % Weight of TDS | Concentration mg/l |
|---|---|---|
| Chloride ($Cl^-$) | 55.04 | 19,400 |
| Sodium ($Na^+$) | 30.61 | 10,800 |
| Potassium ($K^+$) | 1.10 | 392 |
| Magnesium ($Mg^{2+}$) | 3.69 | 1290 |
| Calcium ($Ca^{2+}$) | 1.16 | 411 |
| Sulfate ($SO_4^{2-}$) | 7.68 | 904 |

Typically, although not necessarily, the salt in saline water or brine (as those terms may be broadly used), is understood to be mostly sodium chloride (common salt). However, water is sometimes more specifically classified based on the type of salt predominating in the brine, e.g., chloride brines (that is, including a substantial concentration of calcium chloride, either alone or in addition to sodium chloride), bromide brines, and formate brines.

The solubility of certain salts (that is, the combined ions), such as sodium chloride, is much higher than the concentration of salts found in seawater. For reference, the solubility of a few common salts is shown in Table 4.

TABLE 4

Solubility of Common Salts

| Salt | Solubility mg/l @ 20° C. | Solubility lb/gal (US) @ 20° C. |
|---|---|---|
| Sodium Chloride | 359,000 | 0.79 |
| Magnesium Chloride | 543,000 | 1.12 |
| Calcium Chloride | 745,000 | 1.64 |

Water containing dissolved solids has a higher density than pure water, depending on the nature and concentration of the dissolved solids. The more dissolved solids, the higher the density of the water. This high solubility of certain salts can be used to form aqueous solutions having densities much higher than that of seawater, which may be of use in certain well treatments. For example, the density of freshwater water when measured 20° C. (68° F.) and 1 atmosphere pressure is 8.33 lb/gal (0.998 g/cm$^3$). In comparison, the density of surface seawater ranges from about 8.51-8.59 lb/gal (1.020 to 1.029 g/cm$^3$), depending on the temperature and salinity. The average density of seawater at the surface of the ocean when measured at 1 atmosphere pressure and 22° C. (72° F.) is about 8.54 lb/gal (1.025 g/cm$^3$). The amount of salts in seawater is typically in the range of about 3.1-3.5 wt % (31,000-35,000 ppm). Depending on the type of dissolved salts and the concentrations, the density of brine can be higher than 15 lb/gal.

In the context of hydratable polymers, water having total dissolved solids of less than 0.67 lb/gal (303,000 mg/l), such that the density of the water with the total dissolved solids is less than 9.0 lb/gal, is generally considered not too high for many types of hydratable polymers, although some hydratable polymers may be sensitive to lower concentrations of TDS.

Potential Sources of Water for Use in Treatment Fluids

Non-freshwater sources of water can include surface water ranging from brackish water to seawater, returned water (sometimes referred to as flowback water) from the delivery of a treatment fluid into a well, and produced water.

In the production of oil and gas, great quantities of water are produced. Sources of produced water can include water that may have been introduced into the subterranean formation as part of a well-completion or well-treatment process, water that may have been delivered as part of an injection-well driving process, formation water, and any mixture of any of these. For example, for every barrel of oil produced from a well, it is typical to also obtain about 10 barrels of produced water. Large quantities of produced water continue to be disposed of as waste water, for example, by re-injecting the produced water into a well.

With the rising demand for potable water and freshwater, increasing public concern for the environment, and with the rising costs of obtaining potable water and freshwater, it would be desirable to be able to use lower quality water, such as returned water and produced water, in well treatments.

Unfortunately, returned water and produced water often has high concentrations of total dissolved solids (salts), and may have TDS levels of brackish water, saline water, seawater, or brine. Returned water and produced water may also contain hydrocarbon and other materials. For example, in addition to dissolved and suspended solids, produced water may also contain residual oil, grease, and production chemicals. A production chemical is a chemical that was introduced into the subterranean formation in a prior well treatment and may be found in subsequently produced water. According to this invention, it is recognized that, in general, for water to be suitable for use in common well treatments, usually all that is required is that the water does not contain one or more materials that would be particularly detrimental to the chemistry involved in such well treatments. The water also preferably is cleaned of undissolved, suspended solids (e.g., silt) to a point that the natural permeability and the conductivity of the fracture will not be damaged. For this purpose, all the water used in a well treatment may be filtered to help reduce the concentration of undesirable suspended, undissolved solids that may be present in the water, such as silt. Further, it is recognized that it is even possible to use such water having undesirable concentrations of certain ions or TDS if the water is used as part of the treatment fluid, and the treatment fluid is formed in using the water in a proper sequence.

Of particular concern for use in common well treatment is the avoidance of water containing undesirably-high concentrations of inorganic ions having a valence state of two or more. As is well known in the oil and gas industry, such ions can interfere with the chemistry of forming or breaking certain types of viscous fluids that are commonly used in various well treatments.

Cations that are of common concern include dissolved alkaline earth metal ions, particularly calcium and magnesium ions, and may also include dissolved iron ions.

An anion of common concern includes sulfate.

Normally, however, a high concentration of both calcium ions and sulfate anions in a water source is unlikely. Calcium ions tend to react with sulfate ions to produce calcium sulfate, which is an insoluble salt that tends to precipitate from solution. Similarly, strontium ions and sulfate ions or barium ions and sulfate ions tend to combine and precipitate. Thus, a problem with using water for common well treatments tends to be either an undesirably-high concentration of calcium, strontium, or barium ions or an undesirably-high concentration of sulfate ions.

Borates have the chemical formula $B(OR)_3$, where B=boron, O=oxygen, and R=hydrogen or any organic group. At higher pH ranges, e.g., 8 or above, a borate is capable of increasing the viscosity of an aqueous solution of a water-soluble polymeric material such as a galactomannan or a polyvinyl alcohol. Afterwards, if the pH is lowered, e.g., below 8, the observed effect on increasing the viscosity of the solution can be reversed to reduce or "break" the viscosity back toward its original lower viscosity. It is also well known that, at lower pH ranges, e.g., below 8, borate does not increase the viscosity of such a water-soluble polymeric material. This effect of borate and response to pH provides a commonly-used technique for controlling the cross-linking of certain polymeric viscosity-increasing agents. The control of increasing the viscosity of such fluids and the subsequent "breaking" of the viscosity tends to be sensitive to several factors, including the particular borate concentration in the solution.

Without being limited by any particular theoretical explanation, a borate is believed to be capable of forming labile bonds with two alcohol sites of other molecules. This ability of a borate to react with the alcohol sites can be employed to "cross-link" alcohol sites on different polymer molecules (or possibly other parts of the same molecule) that find their way in a solution to become adjacent to one another. The pH of an aqueous solution controls the equilibrium between boric acid and borate anion in solution. At higher pH ranges, the equilibrium shifts toward a higher concentration of borate ion in the water.

For example, by increasing the pH of a fluid to 8 or above, although usually in the range of about 8.5-12, a borate-releasing compound such as boric acid releases borate ions, which become available for cross-linking a water-soluble polymer having alcohol sites. By subsequently lowering the pH of the fluid to a pH of below 8, for example, by adding or releasing an acid into the fluid, the equilibrium shifts such that less of the borate anion species is in solution, and the cross-linking can be broken, thereby returning such a gelled fluid to a much lower viscosity.

Regardless of the theoretical chemical mechanism of borate cross-linking, which may not yet have been perfectly elucidated and understood, borates are widely used in the oil and gas industry to selectively control an increase and subsequent break in the viscosity of a water-based treatment fluid containing a water-soluble polymeric material having alcohol sites. A fluid having a viscosity greater than that of water can be useful in various well treatments, such as in fracturing a well where the increased viscosity is used to help carry a proppant through a wellbore to a desired location. After having served the intended purpose of a fluid having an increased viscosity, the viscosity of the fluid can be broken to help return the fluid back to the surface as some of the produced water. Therefore, borates are commonly found in produced water.

Borate cross-linking may be undesirable in some well treatments, however, which may interfere with the desired chemistry for a particular well treatment. Thus, the presence of borates or the presence of unknown concentrations of borates is often undesired.

Borates also may be naturally occurring in freshwater, seawater, and formation water, any of which may be found in treated wells, but usually in such low concentrations that the borates normally would not be expected to interfere with the chemistry of common treatment fluids. As borates are often used in various treatment fluids, however, undesirably high concentrations of borates are likely to be present in produced water.

As used herein, a substantial concentration of sulfate ions is defined as being equal to or greater than 500 ppm; a substantial concentration of calcium or magnesium ions is defined as being equal to or greater than a combined total of 1,000 ppm; a substantial concentration of iron ions is defined as being equal to or greater than 10 ppm; a substantial concentration of borate is defined as being equal to or greater than 5 ppm.

Using Lower-Quality Water for a Portion of the Treatment Fluid

There may come a time when potable water available for use for fracturing and other well treatments is severely restricted. A first aspect of the inventions generally relates to using lower-quality water for a portion of the water to be used in a treatment fluid. This allows the use of non-potable water and non-freshwater for a portion of the well treatment, which are less likely to become costly or usage restricted.

More particularly, the first aspect of the inventions generally relates to treating a portion of the water to be used in a treatment fluid. According to one embodiment of this aspect, the method comprises the steps of continuously: (a) pumping a first fluid comprising a first aqueous solution; (b) pumping a second fluid comprising a second aqueous solution; (c) merging at least the first and second fluids to form a treatment fluid comprising a merged aqueous solution, wherein the merged aqueous solution comprises at least 25% by weight of the first aqueous solution and at least 25% by weight of the second aqueous solution, and wherein the merged aqueous solution has a viscosity of less than 100 cP at 40 l/s and at 25° C. (77° F.); and (d) directing the treatment fluid into the wellbore.

According to one embodiment of this first aspect of the inventions: (i) the merged aqueous solution has a merged concentration of at least one component selected from the group consisting of: a dissolved ion, oil, grease, a production chemical, and suspended solids; (ii) the first aqueous solution has a concentration of the at least component that is substantially lower than the merged concentration of the at least one component; and (iii) the second aqueous solution has a concentration of the at least one component that is substantially higher than the merged concentration of the at least one component. According to a preferred embodiment, the component is at least one dissolved ion. Preferably, the first fluid comprises a first concentration of a hydratable additive and the second fluid has a second concentration of the hydratable additive that is substantially lower than the first concentration of the hydratable additive.

According to another embodiment of this first aspect of the inventions: (i) the merged aqueous solution has a merged concentration of total dissolved solids; (ii) the first aqueous solution has a concentration of total dissolved solids that is substantially lower than the merged concentration of total dissolved solids; and (iii) the second aqueous solution has a concentration of total dissolved solids that is substantially higher than the merged concentration of total dissolved solids. Preferably, the first fluid comprises a first concentration of a hydratable additive and the second fluid has a second concentration of the hydratable additive that is substantially lower than the first concentration of the hydratable additive.

A treatment fluid having a merged viscosity of less than 100 cP at 40 l/s and at 25° C. (77° F.) is particularly useful in some water-frac treatments. A treatment fluid having a merged viscosity of less than 50 cP is useful in most water-frac treatments.

Preferably, the first fluid is comprised of at least 50% by weight of the first aqueous solution and wherein the second fluid is comprised of at least 50% by weight of the second aqueous solution.

According to a preferred embodiment, the step of merging is under sufficient conditions to form the treatment fluid to comprise at least 25% by weight of the first aqueous solution and at least 25% by weight of the second aqueous solution.

Typically, the step of pumping the first fluid or the step of pumping the second fluid comprises using more than one fluid pump.

Treating Lower-Quality Water for Use as a Portion of a Treatment Fluid

A second aspect of the inventions generally relates to treating a base aqueous solution to obtain a first aqueous solution, for example, to have a substantially reduced concentration of at least one component relative to the concentration of the at least one component in the base aqueous solution, and using the first aqueous solution and a lower-quality water, such as the base aqueous solution, to form a treatment fluid. The component is selected for being deleterious to the use or performance of a treatment fluid. More particularly, the component is selected from the group consisting of: a dissolved ion, oil, grease, a production chemical, and suspended solids. This allows the use of lower-quality water for some of the water required for making up the treatment fluid, without requiring treating of all the base aqueous solution. The first aqueous solution and the lower-quality water are merged after pumping the fluid portions toward the wellbore.

According to one embodiment of this second aspect of the inventions, a method of forming and delivering a treatment fluid into a wellbore is provided, the method comprising the steps of: (a) treating a base aqueous solution to obtain the first aqueous solution having a substantially reduced concentration of at least one component relative to the concentration of the at least one component in the base aqueous solution, wherein the component is selected from the group consisting of: a dissolved ion, oil, grease, a production chemical, and suspended solids; (b) pumping a first fluid comprising the first aqueous solution; (c) pumping a second fluid comprising a second aqueous solution; (d) merging at least the first and second fluids to form a treatment fluid comprising a merged aqueous solution, wherein the merged aqueous solution comprises at least 25% by weight of the first aqueous solution and at least 25% by weight of the second aqueous solution, and wherein the merged aqueous solution has a merged viscosity of less than 100 cP at 40 l/s and at 25° C. (77° F.); and (e) directing the treatment fluid into the wellbore. More particularly, (i) the merged aqueous solution has a merged concentration of the at least one component; (ii) the first aqueous solution has a concentration of the at least one component that is substantially lower than the merged concentration of the at least one component; and (iii) the second aqueous solution has a concentration of the at least one component that is substantially higher than the merged concentration of the at least one component. Preferably, the component is at least one dissolved ion.

According to another embodiment of this second aspect of the inventions, a method of forming and delivering a treatment fluid into a wellbore is provided, the method comprising the steps of: (a) treating a base aqueous solution to obtain the first aqueous solution having a substantially reduced concentration of total dissolved solids relative to the concentration of the total dissolved solids in the base aqueous solution; (b) pumping a first fluid comprising the first aqueous solution; (c) pumping a second fluid comprising a second aqueous solution; (d) merging at least the first and second fluids to form a treatment fluid having a merged aqueous solution, wherein the merged aqueous solution comprises at least 25% by weight of the first aqueous solution and at least 25% by weight of the second aqueous solution, and wherein the merged aqueous solution has a merged viscosity of less than 100 cP at 40 l/s and at 25° C. (77° F.); and (e) directing the treatment fluid into a wellbore. More particularly, (i) the merged aqueous solution has a merged concentration of total dissolved solids; (ii) the first aqueous solution has a concentration of total dissolved solids that is substantially lower than the merged concentration of total dissolved solids; and (iii) the second aqueous solution has a concentration of total dissolved solids that is substantially higher than the merged concentration of total dissolved solids It should be understood that several different types of treating are available for selectively and partially treating water to remove an undesirable component. The step of treating a portion of the water preferably comprises selectively exchanging at least one dissolved ion for another ion having a different valence. This step of treating is to selectively reduce the concentration of the dissolved ion in the water that is likely to interfere with treatment fluid performance, especially fracturing fluid performance, instead of removing the majority of the ions. More particularly, this invention includes selectively reducing the concentration of a component, such as one or more ions, that interfere with the performance of the treatment fluid. For example, this may include selectively exchanging at least one dissolved ion for another ion having a different valence. Further, this invention recognizes that and takes advantage of the possibility of treating only a portion of the total amount of water required for a well operation or treatment.

Preferably, the at least one ion is selected from the group consisting of calcium, magnesium, sulfate, iron, and borate. According to a preferred embodiment of the invention, the base aqueous solution has a substantial concentration of sulfate ions of equal to or greater than 500 ppm; a substantial concentration of calcium or magnesium ions of equal to or greater than a combined total of 1,000 ppm; a substantial concentration of iron ions of equal to or greater than 10 ppm; or a substantial concentration of borate ions of equal to or greater than 5 ppm.

Selectively removing or exchanging certain ions is also more cost effective than removing the majority of the dissolved ions. There are numerous ways to accomplish this. One method is to exchange the divalent ions with monovalent ions. By chemically performing these substitutions, the treated water is made compatible with fracturing fluids.

For example, the ions $Mg^{+2}$ and $Fe^{+2}$ can be removed by raising the pH (with NaOH or KOH) and then allowing the precipitated $Fe(OH)_2$ and $Mg(OH)_2$ to settle out. Calcium hardness can be removed by adding excess sodium carbonate to precipitate $Ca^{+2}$ as $CaCO_3$. Temporary hardness is caused by bicarbonate salts, which can be removed by boiling the water and leaving behind a calcium carbonate solid. Hard water can be passed through an ion exchange column where hardness ions are captured on the resin. Removal of hardness is the process called water softening.

Methods for treating produced water or other type of water to reduce concentrations of certain undesirable ions are also more particularly disclosed in U.S. application for patent Ser. No. 11/899,299 filed Sep. 5, 2007, entitled "Mobile Systems and Methods of Sufficiently Treating Water So That the Treated Water May Be Utilized in Well Treatments," and having for named inventors Billy Slabaugh (now deceased), Arron Karcher, Michael Segura, Randy Rosine, and Max Phillippi, which is herein incorporated by reference in its entirety. If there is any difference or conflict between the definition or usage of a term in this specification and the specification of another document incorporated herein by reference, the definition or usage of this specification will control.

To reduce all types of dissolved solids in an aqueous solution, less selective methods such as evaporative methods can be used.

Treating produced water or other type of water to reduce any substantial concentrations of one or more of the dissolved sulfate, calcium, strontium, or barium, magnesium, and iron ions, and possibly to reduce any substantial concentrations of borates, may obtain sufficiently treated water for use in many common well treatments. If not specified, water to be treated can be of any source, but is understood to not be suitable for well treatments due to the presence of a substantial concentration of any one or more of the following ions: calcium and magnesium ions, iron ions; sulfate ions; and borate ions.

As used herein, the term "treated water" means water that has been treated according to any one of the various treatment systems or methods to reduce the concentration of at least one ion in the water, unless the context otherwise requires. Of course, the treated water according to the systems and methods of the present invention would not be expected to be potable nor suitable for purposes other than treatment fluids. Saving the cost of unnecessary water purification for use of the water in well treatments, however, is expected to be of enormous economic and practical benefit.

According to a preferred embodiment, the base aqueous solution is selected for having a concentration of total dissolved solids of greater than 40,000 ppm. According to a more preferred embodiment, the first aqueous solution is treated at least sufficiently to have a concentration of total dissolved solids of less than 30,000 ppm. According to a more preferred embodiment, the second aqueous solution is selected for having a concentration of total dissolved solids of greater than 40,000 ppm. Conveniently, the base aqueous solution can be selected to be the same as the second aqueous solution. For example, each of the base and the second aqueous solutions is preferably selected from the group consisting of brine, returned water, produced water, or any combination thereof in any proportion.

Preferably, the treating of the water is performed using a mobile treatment system at or near the well site using a base aqueous solution that is of lower-quality water and readily available near the well site.

According to further preferred embodiments of this second aspect of the invention, the first fluid comprises a first concentration of a hydratable additive and the second fluid has a second concentration of the hydratable additive that is substantially lower than the first concentration of the hydratable additive.

Prehydrating of Hydratable Additive

As described above, some types of viscosity-increasing agents and friction-reducing agents are sensitive to certain ions commonly found dissolved in various types of water. The third aspect of the inventions generally relates to prehydrating an unhydrated hydratable additive in water having a lower concentration of certain ions that can interfere with hydration of the hydratable additive and then mixing the prehydrated additive with water having a higher concentration of such ions. According to this aspect of the inventions, the method comprises the steps of: (a) forming a premix fluid comprising: (i) an unhydrated hydratable additive; and (ii) a first aqueous solution; (b) subsequently forming a treatment fluid comprising: (i) the premix fluid; and (ii) a second aqueous solution; and (c) simultaneously with or subsequently to the step of forming the treatment fluid, delivering the treatment fluid into the wellbore.

According to one embodiment of this third aspect of the inventions: (i) the first aqueous solution has a concentration of at least one ion that is substantially lower than the concentration of the at least one ion in the second aqueous solution; and (ii) the treatment fluid has a merged viscosity of less than 100 cP at 40 l/s and at 25° C. (77° F.). According to a more preferred embodiment, the at least one ion is selected from the group consisting of calcium, magnesium, sulfate, iron, and borate.

According to another embodiment of this third aspect of the inventions: (i) the first aqueous solution has combined dissolved calcium and magnesium ions of less than 10,000 ppm; and (ii) the second aqueous solution has combined dissolved calcium and magnesium ions of greater than 15,000 ppm; and (iii) the treatment fluid has a merged viscosity of less than 100 cP at 40 l/s and at 25° C. (77° F.). According to a more preferred embodiment, the first aqueous solution has combined dissolved calcium and magnesium ions of less than 5,000 ppm. According to a presently most preferred embodiment, the first aqueous solution has combined dissolved calcium and magnesium ions of less than 1,000 ppm.

According to yet another embodiment of this third aspect, (i) the first aqueous solution has total dissolved solids of less than 30,000 ppm; and (ii) the second aqueous solution has total dissolved solids of greater than 40,000 ppm; and (iii) the treatment fluid has a merged viscosity of less than 100 cP at 40 l/s and at 25° C. (77° F.). According to a more-preferred embodiment, the first aqueous solution has total dissolved solids of less than 15,000 ppm. According to a presently most-preferred embodiment, the first aqueous solution has total dissolved solids of less than 1,000 ppm.

As used herein, "hydratable" means that, when a material is mixed with water, it absorbs water to form a hydrate.

According to this aspect of the inventions, a hydratable polymer is initially used in a substantially unhydrated state. As used herein, this means that the hydratable polymer is less than 20% hydrated. Preferably, the unhydrated hydratable polymer is substantially dry, that is, less than 15% hydrated.

"Percent hydration" can be measured and determined based on the total capacity of the material to be hydrated with water. For viscosity-increasing agents, "percent hydration" can be measured and determined as development of a percentage of the viscosity that the polymer would achieve when fully hydrated. To illustrate, if the maximum viscosity reached at full hydration is 22 centipoise at a certain temperature and shear rate, then 50% hydration is achieved when the viscosity reaches 11 centipoise at the same temperature and shear rate. Here, one centipoise is equivalent to one millipascal second (mPa-s). For a given polymer system at a given temperature in a given mixing system, the time to full hydration can be readily determined experimentally or empirically. From the time of mixing with water to full hydration, the time to partial hydration degrees such as 70% and less can likewise be determined. Finally, from the time to partial hydration, the size of the mixing tanks is determined based on the residence calculated from the desired flow rate. The system is said to be sized to achieve a residence time needed to achieve a hydration degree of, for example, about 75%, etc. Naturally, all result-effective variables are taken into consideration when sizing the tanks. These include without limitation flow rate, degree of shear, temperature, nature of the polymer thickener, and so on.

A hydratable polymer is preferably water soluble. As used herein, this means at least 1% by weight soluble in distilled water at 68° F. (20° C.) and 1 atm pressure.

Preferably, the unhydrated hydratable additive is selected from the group consisting of a viscosity-increasing agent, a friction reducer, and any combination thereof in any proportion. According to a preferred embodiment, the unhydrated hydratable additive is selected despite being sensitive to hydration in the presence of calcium or magnesium ions, such that the step of forming a premix fluid allows the use of a lower concentration of hydratable polymer in the treatment fluid to achieve the desired degree of effect from the hydratable polymer in the treatment fluid than would be required to hydrate the unhydrated hydratable polymer in the second aqueous solution under similar conditions. Some types of hydratable polymers, e.g., xanthan gums and certain types of friction reducers do not hydrate properly if the TDS concentration is too high, especially when the high TDS is due to the high concentration of divalent cations.

According to preferred embodiments of this aspect of the inventions, the first aqueous solution is selected from the group consisting of treated water, potable water, freshwater or any combination thereof in any proportion. Preferably, the second aqueous solution is selected from the group consisting of brine, returned water, produced water, or any combination thereof in any proportion.

Preferably, the step of forming the premix fluid is under conditions sufficient to form a premix fluid comprised of at least 50% by weight of the first aqueous solution. The step of forming the premix fluid preferably further comprises mixing under at least sufficient conditions of concentration of the unhydrated hydratable additive in the first aqueous solution, shear, time, temperature, and pH for the hydratable additive to hydrate greater than 50% when measured by viscosity prior to the step of forming a treatment fluid, whereby the mixing conditions help avoid the formation of gel balls (aka "fish eyes"). More preferably, the hydratable additive is hydrated to greater than 70% hydration when measured by viscosity prior to the step of forming a treatment fluid. In various embodiments, the unhydrated hydratable additive is sifted into a water solution or added to water as an emulsion in a carrier fluid such as petroleum oil.

Preferably, the step of forming a treatment fluid is under sufficient conditions to form the treatment fluid to comprise at least 25% by weight of the first aqueous solution and at least 25% by weight of the second aqueous solution, and in combination at least 50% by weight of the first and second aqueous solutions.

Advantageously, the temperature of the fluids used in the methods is from about 34° F. (1° C.) to about 122° F. (50° C.), and more preferably from about 34° F. (1° C.) to about 95° F. (35° C.).

Preferably, the step of delivering the treatment fluid is within a relatively short period after forming the treatment fluid, e.g., one hour. More preferably, the step of delivering the treatment fluid is immediately after the step of forming a treatment fluid ("on the fly"), whereby the higher concentration of calcium and magnesium ions in the treatment fluid from the second aqueous solution does deleteriously effect the hydratable additive during the short time from forming the treatment fluid until the treatment fluid reaches a desired location down the wellbore.

It should be understood that the step of delivering the treatment fluid into the wellbore can advantageously include the use of more than one fluid pump.

For example, when performing a well treatment, such as a water-fracturing treatment, there would be two separate types of water employed, one of which had a higher-water quality in terms of having lower concentration of one or more certain specific ions or TDS than the other. Since most hydratable additives do not hydrate as quickly or completely in water which has high concentrations of certain ions or high TDS, the hydratable additive is prehydrated in the higher-quality water. Once the hydratable additive is prehydrated to the desired degree, it would then be mixed with the lower-quality water for further use. As discussed herein, there are numerous sources of lower-quality water (e.g., water having a high concentration of TDS), such as brine, produced water, and flowback water. The prehydrated additive in the higher-quality water will be concentrated above its final usage concentration since it will be diluted with lower-quality water to form the final treatment fluid. The prehydrated polymer may be brought to location in a prehydrated state, mixed in tanks on location, or prehydrated on the fly in various hydration devices. Both traditional viscosity-increasing agents and friction-reducing agents will benefit from the inventions. For example, it is believed that a prehydrated friction reducer can outperform a friction reducer designed for water having a high concentration TDS at a lower cost.

Preferably, the methods according this third aspect of the inventions further include a step of treating a base aqueous solution to obtain the first aqueous solution having a substantially reduced concentration of at least one ion relative to the base aqueous solution. Preferably, the base aqueous solution is selected to be the same as the second aqueous solution.

Adding Crosslinker, Breaker, Surfactant, Proppant, and Other Additives

Optionally, one or more other additives may be included to form a treatment fluid to be delivered into a wellbore for various purposes, for example, to stimulate the formation. Such additives are typically introduced or mixed into the fluid at a point after hydration of the hydratable additive begins. Normally, there is a time of several minutes before the treatment fluid pumped into the wellbore reaches the formation.

An example of another type of additive is a crosslinking agent. The viscosity of solutions of guar gum and other viscosity-increasing agents (sometimes referred to as "thickeners") can be greatly enhanced by crosslinking them. One example of a crosslinking agent is boric acid. During this time, the incompletely hydrated polymer can continue to develop toward a fully crosslinked viscosity, despite that it may have been crosslinked at less-than-full hydration. In various embodiments, the boron crosslinking agent is also provided in the polymer stream as a mixture of dry ingredients or as part of the petroleum oil emulsion.

Fluids used in the invention also may include a breaker, although not commonly used in water-frac treatments. A breaker is a chemical used for the purpose of diminishing or "breaking" the viscosity of the fluid so that this fluid can be recovered more easily from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH, and, therefore, increasing the effective concentration of the active crosslinker, the borate anion, reversibly creates the borate crosslinks. Lowering the pH can eliminate the borate/polymer bonds. At a high pH above 8, the borate ion exists and is available to crosslink and cause gelling. At a lower pH, the borate is tied up by hydrogen and is not available for crosslinking, thus, increases in viscosity due to crosslinking by borate ion is reversible.

The fluids used according to various embodiments of the inventions may also include suspended material, such as proppant. Proppant particles carried by the treatment fluid remain in the fracture created, thus, propping open the fracture when the fracturing pressure is released and the well is put into production. Suitable proppant materials include, but are not limited to, sand, walnut shells, sintered bauxite, glass beads, ceramic materials, naturally-occurring materials, or similar materials. Mixtures of proppants can be used as well. If sand is used, it typically will be from about 20 to about 100 U.S. Standard Mesh in size. With synthetic proppants, mesh sizes about 8 or greater may be used. The concentration of proppant in the fluid can be any concentration known in the art, and preferably will be in the range of from about 0.03 to about 3 kilograms of proppant added per liter of liquid phase (0.25-25 lb/gal). Also, any of the proppant particles can be coated with a resin to potentially improve the strength, clustering ability, and flow-back properties of the proppant.

Some fluids used in the invention may also include a surfactant. For example, a surfactant may be used for its ability to aid the dispersion and/or stabilization of a gas component into the fluid. Viscoelastic surfactants are also suitable for use in the treatment fluids.

A fiber component may be included in the fluids used in the inventions to achieve a variety of properties including improving particle suspension, particle transport capabilities, and gas phase stability. Fibers used may be hydrophilic or hydrophobic in nature, but hydrophilic fibers are preferred. Fibers can be any fibrous material. The fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid Fluids used in the invention may further contain other additives and chemicals that are known to be commonly used in oil field applications by those skilled in the art. These include, but are not necessarily limited to, breaker aids, co-surfactants, oxygen scavengers, alcohols, scale inhibitors, corrosion inhibitors, fluid-loss additives, oxidizers, bactericides, biocides, and the like.

Pumping at Different Average Bulk Fluid Velocities

Conventionally, a fluid is created on the surface and pumped as a single stream by an array of high-horsepower pumps through a manifold near the well head.

The fourth aspect of the inventions generally relates to pumping a first fluid having either no particulate or a relatively low concentration of a particulate suspended therein and pumping a second fluid having a relatively high concentration of the particulate suspended therein, and then merging at least the first and second fluids to form a treatment fluid having a merged concentration of the particulate. According to this fourth aspect, the method comprises the steps of: (a) pumping a first fluid comprising a first aqueous solution with a first positive-displacement pump; (b) pumping a second fluid comprising a second aqueous solution with a second positive-displacement pump; (c) merging at least the first and second fluids to form a treatment fluid; and (d) directing the treatment fluid into a wellbore. For this aspect of the inventions: (i) the treatment fluid comprises a merged concentration of a particulate; (ii) the first fluid comprises a first concentration of the particulate that is substantially higher than the merged concentration of the particulate; (iii) the second fluid comprises a second concentration of particulate that is substantially lower than the merged concentration of the particulate; and (iv) the first fluid is pumped at a substantially lower average bulk fluid velocity through the first pump than the average bulk fluid velocity at which the second fluid is pumped through the second pump.

In an embodiment of this aspect, the fluid stream is kept in multiple streams (i.e., 2 or more separate streams) where the stream containing the higher concentration of particulate is separate from another fluid stream containing the lower concentration of particulate (or no particulate) until the separate fluid streams have passed through the pumping equipment. At this point, the separate fluid streams have been transformed from low-pressure fluid streams to high-pressure fluid streams. These fluid streams may be merged into a single stream to form the treatment fluid having a desired flow rate and pressure for the well treatment. The fluid streams may be merged as they are directed to the wellbore, as they enter into the wellbore, or as they move through the wellbore.

If the fluid streams are merged prior to moving through the wellbore, the merged stream of the treatment fluid may be partitioned into two or more conduits for directing to the well bore. This is done to keep the bulk fluid velocity of a fluid moving through a conduit below 32 feet per second (9.75 meters per second). The partitioned streams are then merged again into a single stream of the treatment having a combined flow rate and pressure at the wellhead or as the partitioned streams of the treatment fluid move through the wellbore toward a subterranean formation to be treated.

The volumetric flow rate of a fluid is determined by the bulk fluid velocity of a fluid moving perpendicularly through a given area (e.g., the cross-section of a tubular). Thus, the bulk fluid velocity is directly proportional to the volumetric flow rate. Of course, the local fluid velocities adjacent to valves and other surfaces can be much higher than the bulk fluid velocity of the fluid being pumped.

According to general pumping relationships, volumetric flow rate (e.g., in units of gallons per minute) is directly proportional to the pump speed; the discharge head is directly proportional to the square of the pump speed; and the power required by the pump motor is directly proportional to the cube of the pump speed. In a positive-displacement pump, which employs a reciprocating plunger, the pump speed is usually expressed in reciprocations per minute or revolutions per minute ("rpm"). For a positive-displacement pump, the pump speed is the product of the number of plunger strokes per unit time (e.g., rpm) and the plunger stroke length. Thus, the volumetric flow rate through one of the pumping chambers of a fluid end of a positive-displacement pump is directly proportional to the product of the pump speed and the cross-sectional area of the reciprocating plunger. (Of course, the fluid end of a pump typically has a plurality of similarly-sized pumping chambers.)

As used herein, "average bulk fluid velocity" of a fluid is determined by the volume of the fluid pumped through a pumping chamber of a pump over the course of delivering a treatment fluid that is made up with that fluid into a wellbore divided by the cross-sectional area of the plunger for the pumping chamber. Of course, there are numerous geometric factors that affect the local fluid velocities at various instantaneous times during the pumping cycle, at various specific locations within a pump, and over the time of introducing the treatment fluid into a wellbore. In general, however, it is believed that the multitudinous local fluid velocities at various instantaneous times and at various specific locations within a pump throughout the time of introducing the treatment fluid into a wellbore will generally be lower in proportion to a lower average bulk fluid velocity through a pumping chamber of the pump. It is believed that the local fluid velocity at an instantaneous time during the pumping cycle and at a specific surface location within the pumping chamber is directly proportional to the pump speed and plunger size, among other things.

Particle erosion occurs when fluid-entrained particles impinge on surfaces, such as when passing through an orifice, impinging on a metering surface, or making a sharp angle turn in a tubing. Places that can be of particular concern for erosion include, for example, pumps, fluid conveying tubing, surface lines, chokes, manifolds, work strings, valves, and various downhole assemblies. All else being equal, such as the type of particles, the shape and size of the particles, and the concentration of the particles, a fluid containing a particulate that is moving at a lower velocity adjacent a particular surface is believed to cause less erosion to the surface than a fluid moving at higher velocity.

It is presently believed that there is a non-direct relationship of erosive wear to local fluid velocity of a fluid having a suspended particulate therein. Although the relationship has not yet been experimentally determined, it is presently believed that this relationship is exponential. Thus, all else being equal, e.g., for a given fluid and pump size, the rate of erosion in a pump is expected to be exponentially related to pump speed. Table 5 provides an example of such a hypothetical exponential relationship to are arbitrarily selected base pump speed, where it is assumed that all else is equal, such as the type, the shape, mesh size, and concentration of the suspended particles in a given fluid acting on a given configuration and type of test coupon.

TABLE 5

Hypothetical Exponential Relationship of Erosive Wear to Pump Speed

| % of a base pump speed | Multiple of a base erosion rate |
|---|---|
| 400% | 16 |
| 300% | 9 |
| 200% | 4 |
| 150% | 2.25 |
| Base pump speed | 1.0 |
| 70% | 0.5 |
| 57% | 0.33 |
| 50% | 0.25 |
| 33% | 0.11 |

In contrast, however, it is presently believed that there is a direct (i.e., non-exponential) relationship of erosive wear to the concentration of the particulate. Although the relationship has not yet been experimentally determined, Table 6 provides an example of such a hypothetical direct relationship of erosion rate to proppant concentration, assuming a direct proportionality of one-to-one, where it is assumed that all else would be equal, such as for a given type and mesh size of proppant in a given fluid at a given pump speed (directly corresponding to local and average fluid velocities) acting on a given configuration and type of test coupon.

TABLE 6

Hypothetical direct relationship of erosion rate to proppant concentration

| % of a base concentration of proppant | Multiple of a base erosion rate |
|---|---|
| 400% | 4 |
| 300% | 3 |
| 200% | 2 |

TABLE 6-continued

Hypothetical direct relationship of erosion rate to proppant concentration

| % of a base concentration of proppant | Multiple of a base erosion rate |
|---|---|
| 150% | 1.5 |
| Base concentration | 1.0 |
| 70% | 0.7 |
| 57% | 0.57 |
| 50% | 0.5 |
| 33% | 0.33 |

It is believed that the difference between a non-direct (i.e., exponential) relationship between of erosive rate to pump speed and a direct relationship of erosive rate to concentration of a suspended particulate can be used as leverage to reduce erosion in pumping equipment. Thus, it is believed that, when a relatively high-concentration of the particles of a particle-containing fluid is separately pumped at a lower pump speed than a relatively-low concentration of the particles in a different fluid separately pumped at a higher pump speed, it is overall less damaging to all the pumps than if the treatment fluid is first mixed and then pumped downhole. When a treatment fluid is formed and pumped in such a manner, the damage caused from erosion will be reduced in all pumps for the different partitioned fluid streams that will make up the combined treatment fluid directed downhole. Because the pumps wear less, they require less maintenance and deliver increased utilization.

However, this direct relationship of Table 6 between erosion rate and proppant concentration is believed to hold for only a central portion of a response curve. It is believed that at very high concentrations of proppant (in relation to the ranges of concentrations of proppant typically used in a treatment fluid for water fracturing), that the response would not hold. Especially in regard to the range of high concentrations of proppant, it is believed that particle-to-particle interactions begin to play an increasing role with increasing concentration. This may provide additional and unexpected advantage in pumping the first fluid with a high concentration of particulate relative to a second fluid with a low concentration of particulate or no particulate.

The final treatment fluid properties, pump rates, and pump pressures are set by the reservoir properties and the fluid system selected for a given treatment schedule. With this information, the control system optimizes each fluid stream to minimize wear caused from the pumping of the various partitioned streams used to create the final treatment fluid for the stimulation of the well and to allow for optimal use of produced water. It should be understood that the control system would be based on computer computations and preferably several parameters of the method would be under computer control.

Preferably the first fluid and the second fluid each comprise at least 10% by weight of the treatment fluid. According to a more-preferred embodiment, the second fluid comprises at least 50% by weight of the treatment fluid.

According to a preferred embodiment of the method, the first fluid is a water-based fluid, and the second fluid is a water-based fluid. According to a preferred embodiment, the first fluid comprises at least 10% by weight of the treatment fluid, and the second fluid comprises at least 10% by weight of the treatment fluid According to a more-preferred embodiment, the first fluid comprises at least 25% by weight of the treatment fluid, and the second fluid comprises at least 25% by weight of the treatment fluid.

Preferably, the method further comprises the step of: controlling the first concentration of the particulate in the first fluid, the second concentration of the particulate in the second fluid, the volumetric flow rate and pump speed of the first fluid, and the volumetric flow rate and pump speed of the second fluid to reduce the overall wear rate on the first and second pumps.

It should be understood that there are several ways to control the average bulk fluid velocity through a pumping chamber of a pump and for pumping a fluid to achieve a desired total volumetric flow rate, including varying any one or more of the following: (a) the pump speed; (b) using more pumping chambers (e.g., pumps having more pumping chambers or using more pumps); or (c) using pumps having larger pumping chambers (e.g., larger diameter plungers). For example, simply using two pumps of the same type in place of one, each operated at reduced speed, would allow for maintaining volumetric fluid flow rate and reducing erosion through the pumps. Another example would be to selectively use the available pumps that have the largest fluid ends (i.e., the largest pumping chambers with the largest diameter plungers) for the first fluid containing the relatively high concentration of particulate and using other pumps having smaller fluid ends (i.e., smaller pumping chambers with smaller diameter plungers) for the second fluid containing the relatively low concentration of particulate or no particulate. Of course, any combination of these embodiments can be used to advantageously reduce the average bulk fluid velocity of the first fluid.

It should also be understood that the "average bulk fluid velocity" may refer to the average bulk fluid velocity over a plurality of pumping chambers that may be used in pumping the same type of fluid, including through different sizes of pumps operated at different pump speeds. Further, it should be understood that the average bulk fluid velocity refers to the average bulk fluid velocity for a fluid over the course of pumping the treatment fluid downhole. It should also be understood that the first and second pumps may be part of an array comprising more than two pumps. If an array of pumps is involved, in such a case the average bulk fluid velocity of the first fluid being pumped through first pump means the average of the bulk fluid velocities through the plurality of pumping chambers of the pumps used to pump the first fluid. The average bulk fluid velocity of the pumping of the second fluid would be determined similarly.

As previously mentioned, it should be understood that the second concentration of the particulate may be zero. For example, according to a preferred embodiment, (i) the first concentration of the particulate in the first fluid is greater than 200% of the merged concentration of the particulate; and (ii) the first fluid is pumped at an average bulk fluid velocity that is less than 70% of the average bulk fluid velocity at which the second fluid is pumped. As a hypothetical example according to this embodiment, a ratio of 3 pumps to 2 pumps (assuming identical types and sizes of pumps) could be operated as follows: Three of the pumps would operate at about 70% pump speed to pump a first fluid having 200% of the concentration of proppant desired for the final treatment fluid. Two of the pumps would operate at 100% pump speed to pump a second fluid without having any proppant therein. (It should be understood, of course, that "100% pump speed" may be well under the maximum operating capacity of a pump in order to prevent overloading of the transmission between the engine and the fluid end of the pump.) After pumping, the first and second fluid would be merged through a manifold or multiple manifolds and directed into a wellbore. The first fluid would account for 50% by volume of the treatment fluid. The second fluid would account for about 50% by volume of the treatment fluid. The resulting treatment fluid would have the desired concentration of proppant.

As another hypothetical example according to this embodiment, a ratio of 2 pumps to 2 pumps (assuming identical types and sizes of pumps) could be operated as follows: Two of the pumps could operate at about 50% pump speed to pump a first fluid having 200% of the concentration of proppant desired for the treatment fluid. Two of the pumps would operate at 100% pump speed to pump a second fluid having only 50% of the concentration of proppant desired for the treatment fluid. After pumping, the first and second fluid would be merged through a manifold or multiple manifolds and directed into a wellbore. The first fluid would account for about ⅔ by volume of the treatment fluid. The second fluid would account for about ⅓ by volume of the treatment fluid. The resulting treatment fluid would have the desired concentration of proppant.

According to a presently more preferred embodiment, (i) the first concentration of the particulate in the first fluid is greater than 400% the merged concentration of the particulate; and (ii) the first fluid is pumped at an average bulk fluid velocity that is less than 50% of the average bulk fluid velocity at which the second fluid is pumped. As a hypothetical example according to this embodiment, a ratio of 2 pumps to 3 pumps (assuming identical types and sizes of pumps) could be operated as follows: Two of the pumps would operate at 50% pump speed to pump a first fluid having 400% of the concentration of proppant desired for the final treatment fluid. Three of the pumps would operate at 100% pump speed to pump a second fluid without any proppant therein. After pumping, the first and second fluid would be merged through a manifold or multiple manifolds and directed into a wellbore. The first fluid would account for 25% by volume of the final treatment fluid. The second fluid would account for 75% by volume of the final treatment fluid. The resulting treatment fluid would have the desired concentration of proppant.

FIG. 1 is a flow diagram of a conventional equipment spread used in hydraulic fracturing of a well. A typical fracturing uses water that is entirely made up of potable water, freshwater, and/or treated water. The water is mixed with a viscosity-increasing agent in an "ADP OR GEL PRO" mixer or mixing step to provide a higher viscosity fluid to help suspend sand or other particulate. The water and/or the higher-viscosity water-based fluid are then mixed with sand in a blender to form a treatment fluid for fracturing the well. An array of high-pressure ("HP") pumps that are arranged in parallel is used to deliver the treatment fluid into the wellbore of a well.

Figure 2:
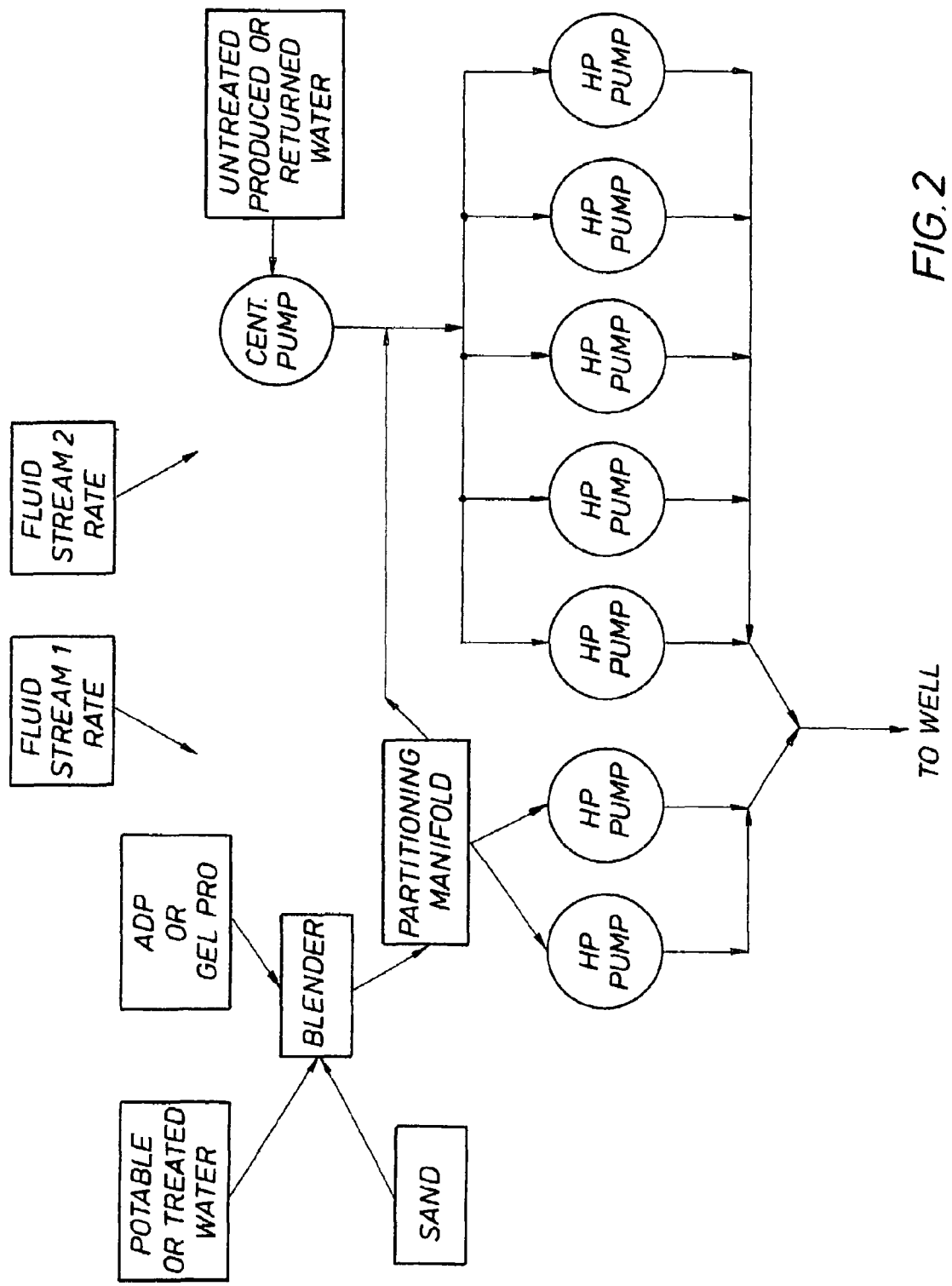
FIG. 2 is a flow diagram of an example of the equipment spread that may be used in various methods according to the inventions. Fluid stream 1 is comprised of, for example, potable water, freshwater, treated water, or any combination thereof, such that it has, for example, relatively low total dissolved solids. The treated water for use in Fluid stream 1 may have been subjected to water treatments such as filtration to remove undissolved solids, removal of certain dissolved ions, pH adjustment, and bacterial treatment. Fluid stream 2 is comprised of, for example, untreated produced, returned water, brine, or any combination thereof such that it has, for example, relatively high total dissolved solids. A low pressure pump, e.g., a centrifugal pump, may be used to transport the water for fluid stream 2 to the HP pumps. The relatively clean water is mixed with a viscosity-increasing agent to provide a higher viscosity fluid to help suspend sand or other particulate. The relatively clean water and/or the higher-viscosity fluid are then mixed with sand in a blender. An array of HP pumps that are arranged in parallel is used to pump fluid stream 1 and fluid stream 2, after which the fluid streams are merged to form a treatment fluid and directed into the wellbore of a well. Chemicals, such as viscosity-increasing agent or fluid friction-reducing agent, and other materials, such as sand, may be partitioned via a partitioning manifold between the fluid stream 1 and fluid stream 2. According to one of the aspects of the inventions, the pumps may be operated to pump fluid stream 1 and fluid stream 2 at different average bulk fluid velocities based on different concentrations of particulate in the fluid streams to reduce pump wear and maintenance.

FIG. 2 is a flow diagram of an example of the equipment spread that may be used in various methods according to the inventions. Fluid stream 1 is comprised of, for example, potable water, freshwater, treated water, or any combination thereof, such that it has, for example, relatively low total dissolved solids. The treated water for use in Fluid stream 1 may have been subjected to water treatments such as filtration to remove undissolved solids, removal of certain dissolved ions, pH adjustment, and bacterial treatment. Fluid stream 2 is comprised of, for example, untreated produced, returned water, brine, or any combination thereof such that it has, for example, relatively high total dissolved solids. A low pressure pump, e.g., a centrifugal pump, may be used to transport the water for fluid stream 2 to the HP pumps. The relatively clean water is mixed with a viscosity-increasing agent to provide a higher viscosity fluid to help suspend sand or other particulate. The relatively clean water and/or the higher-viscosity fluid are then mixed with sand in a blender. An array of HP pumps that are arranged in parallel is used to pump fluid stream 1 and fluid stream 2, after which the fluid streams are merged to form a treatment fluid and directed into the wellbore of a well. Chemicals, such as viscosity-increasing agent or fluid friction-reducing agent, and other materials, such as sand, may be partitioned via a partitioning manifold between the fluid stream 1 and fluid stream 2. According to one of the aspects of the inventions, the pumps may be operated to pump fluid stream 1 and fluid stream 2 at different rates based on different concentrations of particulate in the fluid streams to reduce pump wear and maintenance.

Figure 3:
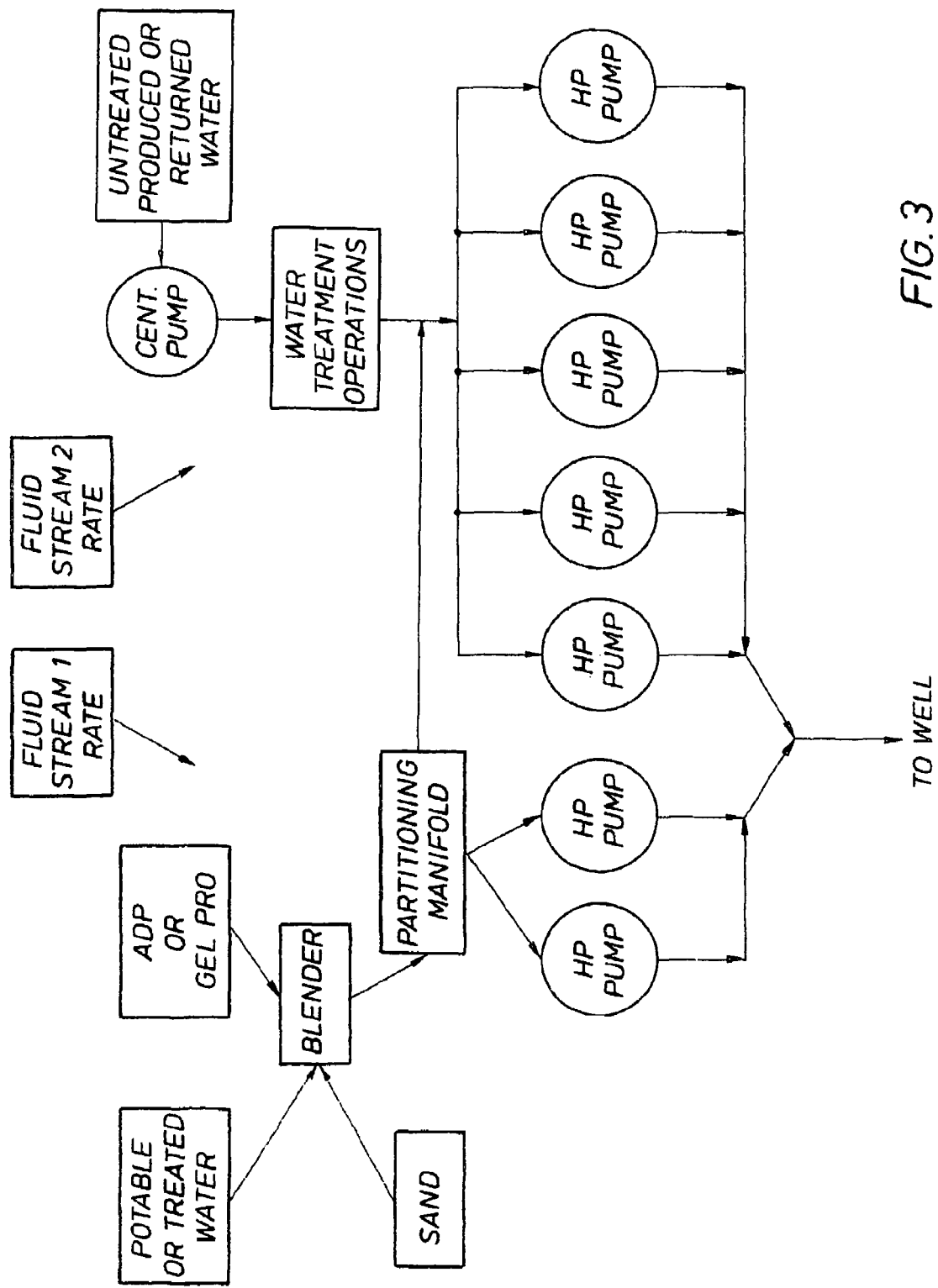
FIG. 3 is a flow diagram similar to the flow diagram of FIG. 2 with the addition of an optional step of water-treatment operations in fluid stream 2. The water-treatment operations may be, for example, for the removal of one or more undesirable components. Water treatments may include filtration to remove undissolved solids, removal of certain dissolved ions, pH adjustment, and bacterial treatment. The water treatments used to obtain treated water for use in fluid stream 1 are expected to be different than those used in fluid stream 2.
Figure 4:
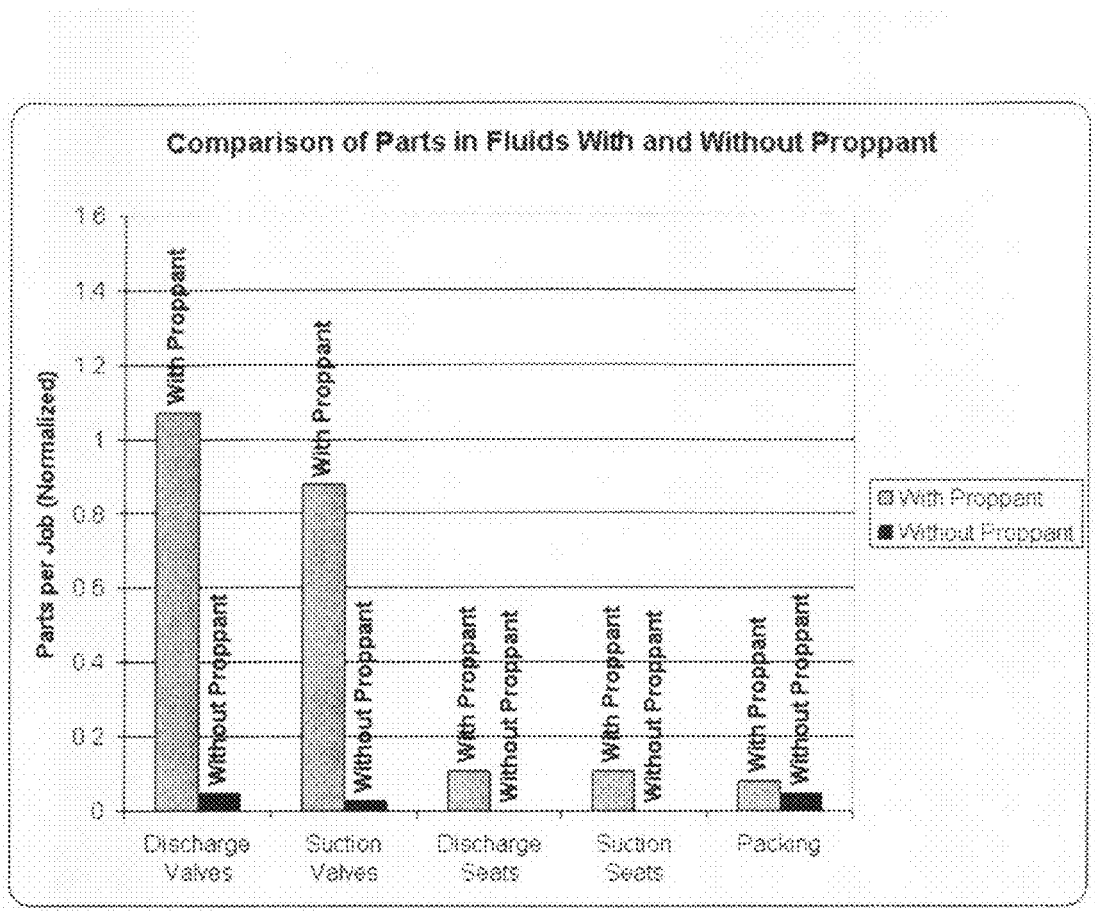
FIG. 4 is a graphical representation of the erosion wear for pumps used in pumping either fluid with proppant or without proppant. This data was collected during actual water-frac stimulation treatments done over a 3-month time frame. During the test period, a total of 9.5 million pounds of proppant were pumped in 4.93 million gallons of fluid in a total of 148 treating applications.

FIG. 3 is a flow diagram similar to the flow diagram of FIG. 2 with the addition of an optional step of water-treatment operations in fluid stream 2. The water-treatment operations may be, for example, for the removal of undesirable components. Water treatments may include filtration to remove undissolved solids, removal of certain dissolved ions, pH adjustment, and bacterial treatment. The water treatments used to obtain treated water for use in fluid stream 1 are expected to be different than those used in fluid stream 2.

Furthermore, the split stream process gives the ability to use lower-quality water, such as untreated produced water, in more types of well treatments where the TDS of the produced water (or specific ions) would interfere with the chemical reactions required for the treatment. This is accomplished by mixing the chemicals and proppant in concentrated form through one or more blenders and pre-blenders using higher-quality water, such as freshwater, potable water, or treated water. The rest of the required water for the final treatment fluid can be of the lower-quality water, such as untreated formation water, produced water, or flow back waters. This process allows the addition of different viscosity-increasing agents, friction-reducing agents, and other fluid-property modifying agents in any of the fluid streams depending on the compatibility with the type of water. Preferably, for example, the unhydrated hydratable polymer would be used with the higher-quality water, for example, to help suspend the proppant.

There is also a commercial advantage through increasing the number of stimulation treatments that can be pumped using lower-quality water, such as untreated produced water. This reduces the amount of higher-quality water, such as freshwater or potable water, that must be purchased and also the cost paid to dispose of the produced water that is normally unacceptable for use in making up a well treatment fluid due to chemical compatibility issues.

The invention also has the ability to use varying amounts of higher-quality water vs. lower-quality water in the same well treatment and to mix and blend modifying chemical agents with the most compatible water type. This methodology, thus, gives the chemical agents time to react with the other components before combining with the other fluid streams.

In an example, the total required treating volume would be ⅓ relatively clean water (i.e., potable water, freshwater, or partially-treated water) with proppant and ⅔ untreated water (i.e., brackish water to brine or produced water). These two streams can be combined to create the final treatment fluid after passing through the pumping equipment to yield a treatment fluid having the desired properties.

Pumping Streams with Different Concentrations of Particulate and Hydratable Additive The fifth aspect of the inventions generally relates to pumping a first fluid having a relatively high concentration of a particulate suspended therein and pumping a second fluid having either none of the particulate or a relatively low concentration of the particulate suspended therein, and then merging at least the first and second fluids to form a treatment fluid having a merged concentration of the particulate. According to this aspect, the first fluid also has a relatively high concentration of a hydratable additive and the second fluid has either none or a relatively low concentration of the additive. In this context, the particulate means and refers to a solid, insoluble material having consistently defined characteristics, such as mesh size. An example of a particulate includes, for example, 20-40 mesh sand for use as proppant. The additive is preferably selected from the group consisting of a water-soluble viscosity-increasing agent, a water-soluble a friction-reducing agent, or a water-soluble elasticity-increasing agent.

According to this fifth aspect, the method comprises the steps of: (a) pumping a first fluid comprising a first aqueous solution with a first positive-displacement pump; (b) pumping a second fluid comprising a second aqueous solution with a second positive-displacement pump; (c) merging at least the first and second fluids to form a treatment fluid; and (d) directing the treatment fluid into a wellbore. For this aspect of the inventions: (i) the treatment fluid comprises a merged concentration of a particulate and a merged concentration of a hydratable additive; (ii) the first fluid comprises a first concentration of the particulate that is substantially higher than the merged concentration of the particulate and a first concentration of the additive that is substantially higher than the merged concentration of the additive; and (iii) the second fluid comprises a second concentration of the particulate that is substantially lower than the merged concentration of the particulate and a second concentration of the additive that is substantially lower than the merged concentration of the additive.

It is believed that the combination of both a higher concentration of the particulate combined with a higher concentration of the hydratable additive is capable of reducing overall erosive wear on pumps. According to this aspect, it is believed that there is a synergistic advantage in reducing the wear based on the combination of both an unusually higher concentration of the particulate and an unusually high concentration of the hydratable additive in the pumping of first fluid. It is believed this is an independent method capable of reducing overall pump wear.

In addition to controlling the relative concentrations of the particulate and the hydratable additive, it can also be desirable that the first fluid is pumped at a substantially lower pump speed than the pump speed at which the second fluid is pumped.

Preferably, the first aqueous solution and the second aqueous solution each comprise at least 10% by weight of the treatment fluid. More preferably, the second aqueous solution comprises at least 50% by weight of the treatment fluid. According to a preferred embodiment, the first fluid is a water-based fluid and the second fluid is a water-based fluid. According to a more preferred embodiment, the first aqueous solution comprises at least 25% by weight of the treatment fluid and the second aqueous solution comprises at least 25% by weight of the treatment fluid.

According to another preferred embodiment of the fifth aspect of the inventions, the step of pumping a first fluid further comprises pumping the first fluid with a first pump, and wherein the step of pumping a second fluid further comprises pumping the second fluid with a second pump. Preferably, the method further rises the step of: controlling the first concentration of the particulate in the first fluid, the first concentration of the hydratable additive in the first fluid, the second concentration of particulate in the second fluid, and the second concentration of the additive in the second fluid to reduce the overall wear rate on the first and second pumps. It should be understood that the first and second pumps may be positive displacement pumps. It should also be understood that the first and second pumps may be part of an array comprising more than two pumps.

More particularly, it should be understood that the second concentration of the particulate may be zero. Similarly, it should be understood that the second concentration of the hydratable additive may be zero.

According to a presently preferred embodiment, (i) the first concentration of the particulate in the first fluid is greater than 200% of the merged concentration of the particulate; and (ii) the first concentration of the hydratable additive is greater than 200% of the merged concentration of the additive. According to a presently more preferred embodiment, (i) the first concentration of the particulate in the first fluid is greater than 400% the merged concentration of the particulate; and (ii) the first concentration of the additive is greater than 400% of the merged concentration of the additive.

In addition, it is expected that it will be synergistically advantageous to combine this aspect of the inventions with controlling the pumping rate of the fluids. Preferably, for example, the first fluid is pumped at a substantially lower pump speed than the pump speed at which second fluid is pumped.

Various Combination of Steps

It should be appreciated that the various steps according to the inventions can be combined advantageously or practiced together in various combinations to increase the efficiency and benefits that can be obtained from the inventions. For example, produced water could be treated to reduce the concentration of at least one type of dissolved ions therein. The treated water could be used in a step of prehydrating an unhydrated hydratable additive. Proppant could be mixed during or after the step of prehydrating, for example, wherein the hydratable additive is a viscosity-increasing agent. In addition, a step of mixing other additives to the fluid could also be included. The fluid having the treated water and/or the prehydrated additive could be pumped as a separate stream from a stream of fluid including the produced water. After pumping, the two streams could be merged and directed into the wellbore to form the desired treatment fluid. It should also be understood that more than two streams of fluid could be formed and merged after pumping to form the final treatment fluid.

Thus, the present inventions are well adapted to carry out the objects and attain the ends and advantages mentioned above as well as those inherent therein. While preferred embodiments of the inventions have been described for the purpose of this disclosure, changes in the sequence of steps and the performance of steps can be made by those skilled in the art, which changes are encompassed within the spirit of this invention as defined by the appended claims.

What is claimed is:

1. A method of forming and delivering a treatment fluid into a wellbore, the method comprising the steps of continuously:
   (a) pumping a first fluid comprising a first aqueous solution;
   (b) pumping a second fluid comprising a second aqueous solution;
   (c) merging at least the first and second fluids to form a treatment fluid comprising a merged aqueous solution, wherein the merged aqueous solution comprises at least 25% by weight of the first aqueous solution and at least 25% by weight of the second aqueous solution, and wherein the merged aqueous solution has a merged viscosity of less than 100 cP at 40 l/s and at 25° C. (77° F.), and wherein the step of merging is after the steps of pumping the first and second fluids; and then (d) directing the treatment fluid into the wellbore;

wherein:
  (i) the merged aqueous solution has a merged concentration of at least one component selected from the group consisting of: a dissolved ion, oil, grease, a production chemical, and suspended solids;
  (ii) the first aqueous solution has a concentration of the at least one component that is substantially lower than the merged concentration of the at least one component;
  (iii) the second aqueous solution has a concentration of the at least one component that is substantially higher than the merged concentration of the at least one component; and
  (iv) the first, second, and treatment fluids are handled as fluid streams.

2. The method according to claim 1, wherein the first fluid comprises a first concentration of a hydratable additive and the second fluid has a second concentration of the hydratable additive that is substantially lower than the first concentration of the hydratable additive.

3. The method according to claim 1, wherein the merged aqueous solution has a merged viscosity of less than 35 cP.

4. The method according to claim 1, wherein the component is at least one dissolved ion.

5. The method according to claim 4, further comprising a step of treating a base aqueous solution to obtain the first aqueous solution having a substantially reduced concentration of the at least one ion relative to the concentration of the at least one ion in the base aqueous solution.

6. The method according to claim 5, wherein the step of treating comprises selectively reducing the concentration of the at least one dissolved ion.

7. The method according to claim 4, wherein the at least one ion is selected from the group consisting of calcium, magnesium, sulfate, iron, and borate.

8. The method according to claim 7, wherein the second aqueous solution has a substantial concentration of sulfate ions of equal to or greater than 500 ppm; a substantial concentration of calcium or magnesium ions of equal to or greater than a combined total of 1,000 ppm; a substantial concentration of iron ions of equal to or greater than 10 ppm; or a substantial concentration of borate ions of equal to or greater than 5 ppm.

9. The method according to claim 1, further comprising a step of forming the first fluid comprising:
  (i) an unhydrated hydratable additive; and
  (ii) the first aqueous solution.

10. The method according to claim 9, further comprising a step of allowing the hydratable additive in the first fluid to reach at least 50% hydration prior to the step of pumping the first fluid.

11. The method according to claim 1, wherein:
  (i) the treatment fluid comprises a merged concentration of a particulate;
  (ii) the first fluid comprises a first concentration of the particulate that is substantially higher than the merged concentration of the particulate;
  (iii) the second fluid comprises a second concentration of the particulate that is substantially lower than the merged concentration of the particulate; and
  (iv) the first fluid is pumped at a substantially lower average bulk fluid velocity than the second fluid.

12. The method according to claim 1, wherein:
  (i) the treatment fluid comprises a merged concentration of a particulate and a merged concentration of the hydratable additive;
  (ii) the first fluid comprises a first concentration of the particulate that is substantially higher than the merged concentration of the particulate and a first concentration of the additive that is substantially higher than the merged concentration of the additive;
  (iii) the second fluid comprises a second concentration of the particulate that is substantially lower than the merged concentration of the particulate and a second concentration of the additive that is substantially lower than the merged concentration of the additive.

13. The method according to claim 1, wherein the wellbore penetrates an oil or gas reservoir.

14. The method according to claim 1, wherein the first fluid is pumped with a first positive-displacement pump, and the second fluid is pumped with a second positive-displacement pump.

15. A method of forming and delivering a treatment fluid into a wellbore, the method comprising the steps of continuously:
  (a) pumping a first fluid comprising a first aqueous solution;
  (b) pumping a second fluid comprising a second aqueous solution;
  (c) merging at least the first and second fluids to form a treatment fluid comprising a merged aqueous solution, wherein the merged aqueous solution comprises at least 25% by weight of the first aqueous solution and at least 25% by weight of the second aqueous solution, and wherein the merged aqueous solution has a merged viscosity of less than 100 cP at 40 l/s and at 25° C. (77° F.), and wherein the step of merging is after the steps of pumping the first and second fluids; and then
  (d) directing the treatment fluid into a wellbore;

wherein:
  (i) the merged aqueous solution has a merged concentration of total dissolved solids;
  (ii) the first aqueous solution has a concentration of total dissolved solids that is substantially lower than the merged concentration of total dissolved solids;
  (iii) the second aqueous solution has a concentration of total dissolved solids that is substantially higher than the merged concentration of total dissolved solids; and
  (iv) the first, second, and treatment fluids are handled as fluid streams.

16. The method according to claim 15, wherein the first fluid comprises a first concentration of a hydratable additive and the second fluid has a second concentration of the hydratable additive that is substantially lower than the first concentration of the hydratable additive.

17. The method according to claim 15, wherein the merged aqueous solution has a merged viscosity of less than 35 cP.

18. The method according to claim 15, further comprising a step of treating a base aqueous solution to obtain the first aqueous solution having a substantially reduced concentration of total dissolved solids relative to the concentration of total dissolved solids in the base aqueous solution.

19. The method according to claim 18, wherein the base aqueous solution is selected for having a concentration of total dissolved solids of greater than 40,000 ppm.

20. The method according to claim 19, wherein the first aqueous solution is treated at least sufficiently to have a concentration of total dissolved solids of less than 30,000 ppm.

21. The method according to claim 19, wherein the second aqueous solution is selected for having a concentration of total dissolved solids of greater than 40,000 ppm.

22. The method according to claim 18, wherein the base aqueous solution is selected to be the same as the second aqueous solution.

23. The method according to claim 15, wherein the wellbore penetrates an oil or gas reservoir.

24. The method according to claim 15, wherein the first fluid is pumped with a first positive-displacement pump, and the second fluid is pumped with a second positive-displacement pump.

* * * * *

UNITED STATES PATENT AND TRADEMARK OFFICE
CERTIFICATE OF CORRECTION

| | | |
|---|---|---|
| PATENT NO. | : 7,621,330 B1 | Page 1 of 1 |
| APPLICATION NO. | : 12/151505 | |
| DATED | : November 24, 2009 | |
| INVENTOR(S) | : Harold Walters et al. | |

It is certified that error appears in the above-identified patent and that said Letters Patent is hereby corrected as shown below:

On the Title Page
Item (75) Inventors section on the title page. The spelling of Inventor Herbert Hornick is incorrect. The correct spelling is HORINEK.

Signed and Sealed this

Twenty-third Day of February, 2010

David J. Kappos
*Director of the United States Patent and Trademark Office*